(12) United States Patent
Teng et al.

(10) Patent No.: US 11,269,311 B2
(45) Date of Patent: Mar. 8, 2022

(54) SPRAY FORMING STRUCTURAL JOINTS

(71) Applicant: DIVERGENT TECHNOLOGIES, INC., Los Angeles, CA (US)

(72) Inventors: Alexander Pai-chung Teng, Lomita, CA (US); Eahab Nagi El Naga, Topanga, CA (US); Steven Blair Massey, Jr., Appleton, WI (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 555 days.

(21) Appl. No.: 16/046,462

(22) Filed: Jul. 26, 2018

(65) Prior Publication Data

US 2020/0033833 A1 Jan. 30, 2020

(51) Int. Cl.
*G06F 19/00* (2018.01)
*G05B 19/4099* (2006.01)
(Continued)

(52) U.S. Cl.
CPC .......... *G05B 19/4099* (2013.01); *B33Y 10/00* (2014.12); *B33Y 30/00* (2014.12);
(Continued)

(58) Field of Classification Search
CPC ...... B22F 10/20; B22F 2999/00; B22F 7/062; B22F 10/30; B22F 12/00; B22F 2998/10; B33Y 10/00; B33Y 30/00; B33Y 40/20; B33Y 50/00; B33Y 50/02; C23C 24/04; G05B 19/4099; G05B 2219/35134; G05B 2219/49007; Y02P 10/25; Y02P 90/02
See application file for complete search history.

(56) References Cited

U.S. PATENT DOCUMENTS 5,203,226 A 4/1993 Hongou et al.
5,742,385 A 4/1998 Champa
(Continued)

FOREIGN PATENT DOCUMENTS

CN 107009623 A 8/2017
WO 1996036455 A1 11/1996
(Continued)

OTHER PUBLICATIONS

US 9,202,136 B2, 12/2015, Schmidt et al. (withdrawn)
(Continued)

*Primary Examiner* — Zhipeng Wang
(74) *Attorney, Agent, or Firm* — Arent Fox LLP

(57) ABSTRACT

Systems, apparatus, and method for manufacturing a structure are disclosed. The structure includes a first portion, a second portion, and a structural joint. The apparatus is configured to receive instructions for printing the structural joint. The instructions are based on a data model of the structural joint. The apparatus is also configured to receive the first portion and the second portion, the first portion having a first conical tip and the second portion having a second conical tip. The apparatus is further configured to receive material. Additionally, the apparatus is configured to print the structural joint based on the instructions. The printing may include spray forming the material to produce the structural joint. The structural joint connects the first portion to the second portion.

38 Claims, 13 Drawing Sheets

(51) Int. Cl.
*C23C 24/04* (2006.01)
*B33Y 50/02* (2015.01)
*B33Y 10/00* (2015.01)
*B33Y 30/00* (2015.01)

(52) U.S. Cl.
CPC .............. *B33Y 50/02* (2014.12); *C23C 24/04* (2013.01); *G05B 2219/35134* (2013.01); *G05B 2219/49007* (2013.01)

(56) References Cited

U.S. PATENT DOCUMENTS

| | | | |
|---|---|---|---|
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,703,233 | B2 * | 4/2014 | Miller .................. H01J 37/3417 427/191 |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |
| 9,783,324 | B2 | 10/2017 | Embler et al. |
| 9,783,977 | B2 | 10/2017 | Alqasimi et al. |
| 9,789,548 | B2 | 10/2017 | Golshany et al. |
| 9,789,922 | B2 | 10/2017 | Dosenbach et al. |
| 9,796,137 | B2 | 10/2017 | Zhang et al. |

(56) References Cited

U.S. PATENT DOCUMENTS

| | | |
|---|---|---|
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |

(56) References Cited

U.S. PATENT DOCUMENTS

| | | | |
|---|---|---|---|
| 10,313,651 B2 | 6/2019 | Trevor et al. | |
| 10,315,252 B2 | 6/2019 | Mendelsberg et al. | |
| 10,329,033 B2* | 6/2019 | Choi | B22F 7/06 |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2006/0108783 A1 | 5/2006 | Ni et al. | |
| 2010/0170937 A1* | 7/2010 | Calla | C23C 24/04 228/165 |
| 2014/0277669 A1 | 9/2014 | Nardi et al. | |
| 2017/0072629 A1 | 3/2017 | Reznar | |
| 2017/0106592 A1 | 4/2017 | Keating et al. | |
| 2017/0113344 A1 | 4/2017 | Schönberg | |
| 2017/0248802 A1 | 8/2017 | Rasschaert et al. | |
| 2017/0341309 A1 | 11/2017 | Piepenbrock et al. | |
| 2018/0135675 A1* | 5/2018 | Glueck | B23K 26/354 |
| 2018/0250889 A1 | 9/2018 | Czinger et al. | |
| 2019/0316262 A1* | 10/2019 | Camilleri | B22F 10/20 |

FOREIGN PATENT DOCUMENTS

| | | | |
|---|---|---|---|
| WO | 1996036525 A1 | 11/1996 | |
| WO | 1996038260 A1 | 12/1996 | |
| WO | 2003024641 A1 | 3/2003 | |
| WO | 2004108343 A1 | 12/2004 | |
| WO | 2005093773 A1 | 10/2005 | |
| WO | 2007003375 A1 | 1/2007 | |
| WO | 2007110235 A1 | 10/2007 | |
| WO | 2007110236 A1 | 10/2007 | |
| WO | 2008019847 A1 | 2/2008 | |
| WO | 2007128586 A3 | 6/2008 | |
| WO | 2008068314 A2 | 6/2008 | |
| WO | 2008086994 A1 | 7/2008 | |
| WO | 2008087024 A1 | 7/2008 | |
| WO | 2008107130 A1 | 9/2008 | |
| WO | 2008138503 A1 | 11/2008 | |
| WO | 2008145396 A1 | 12/2008 | |
| WO | 2009083609 A2 | 7/2009 | |
| WO | 2009098285 A1 | 8/2009 | |
| WO | 2009112520 A1 | 9/2009 | |
| WO | 2009135938 A1 | 11/2009 | |
| WO | 2009140977 A1 | 11/2009 | |
| WO | 2010125057 A2 | 11/2010 | |
| WO | 2010125058 A1 | 11/2010 | |
| WO | 2010142703 A2 | 12/2010 | |
| WO | 2011032533 A1 | 3/2011 | |
| WO | 2014016437 A1 | 1/2014 | |
| WO | 2014187720 A1 | 11/2014 | |
| WO | 2014195340 A1 | 12/2014 | |
| WO | 2015193331 A1 | 12/2015 | |
| WO | 2016116414 A1 | 7/2016 | |
| WO | 2017036461 A1 | 3/2017 | |
| WO | 2017041900 A1 | 3/2017 | |
| WO | 2018072034 A1 | 4/2018 | |
| WO | 2019030248 A1 | 2/2019 | |
| WO | 2019042504 A1 | 3/2019 | |
| WO | 2019048010 A1 | 3/2019 | |
| WO | 2019048498 A1 | 3/2019 | |
| WO | 2019048680 A1 | 3/2019 | |
| WO | 2019048682 A1 | 3/2019 | |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion received in PCT/US2019/042889 dated Oct. 24, 2019.

* cited by examiner

SPRAY FORMING STRUCTURAL JOINTS

BACKGROUND

Field

The present disclosure relates generally to manufacturing techniques, and more specifically 3-D-printing methods using spray forming to manufacture structural joints.

Background

Key technological developments and advances in manufacturing have been made in recent years with the increasingly widespread use of three dimensional (3-D) printing for a variety of applications. Such applications are especially prevalent in the context of manufacturing numerous types of sophisticated mechanical structures. Similar advances have recently been made, and milestones achieved, relative to the advancement of 3-D printing technologies themselves. The plethora of modern 3-D printing techniques that have been the subject of such recent advances include, for example, stereolithography (SLA), digital light processing (DLP), fused deposition modeling (FDM), selective laser sintering (SLS), selective laser melting (SLM), and the like.

Various limitations with existing 3-D-printing applications persist. As an illustration, 3-D printing using FDM and other techniques rely on the successive deposition of layers of material. As a result of this layer-by-layer deposition technique, printed parts may exhibit a stair-stepped effect, known as striations, especially with respect to angled surfaces. Where the printed part is, by way of example, a panel such as a hood for a vehicle, the part may fall out of applicable vehicular requirements and specifications. Thus these printed parts may require additional sanding, machining, or other finishing steps to make them smooth.

For example, using conventional manufacturing techniques, parts may be manufactured. Thereafter, the parts may need to be joint. The systems and methods described herein may use spray forming to manufacture structural joints that may be used to join parts together.

SUMMARY

Several aspects of methods will be described more fully hereinafter with reference to three-dimensional (3-D) printing techniques. One aspect relates to manufacturing techniques that include 3-D-printing methods using spray forming to manufacture structural joints.

Systems, apparatus, and method for manufacturing a structure are disclosed. The structure includes a first portion, a second portion, and a structural joint. The apparatus is configured to receive instructions for printing the structural joint. The instructions are based on a data model of the structural joint. The apparatus is also configured to receive the first portion and the second portion, the first portion having a first conical tip and the second portion having a second conical tip. The apparatus is further configured to receive material. Additionally, the apparatus is configured to print the structural joint based on the instructions. The printing may include spray forming the material to produce the structural joint. The structural joint connects the first portion to the second portion.

In an aspect, a method of forming a structure is disclosed. The structure includes a first portion, a second portion, and a structural joint. The method includes receiving instructions for printing the structural joint. The instructions may be based on a data model of the structural joint. The method also includes receiving the first portion and the second portion. Additionally, the method includes receiving material. The method also includes printing the structural joint based on the instructions. The printing including spray forming the material to produce the structural joint and rotating the first portion and the second portion during the spray forming. The structural joint connects the first portion to the second portion.

It will be understood that other aspects of 3-D printing using spray forming will become readily apparent to those skilled in the art from the following detailed description, wherein it is shown and described only several embodiments by way of illustration. As will be realized by those skilled in the art, the manufactured structures and the methods for manufacturing these structures are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of 3-D printing using spray forming to manufacture a structural joint will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of 3-D printing using spray forming to manufacture structural joints and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Figure 1B:
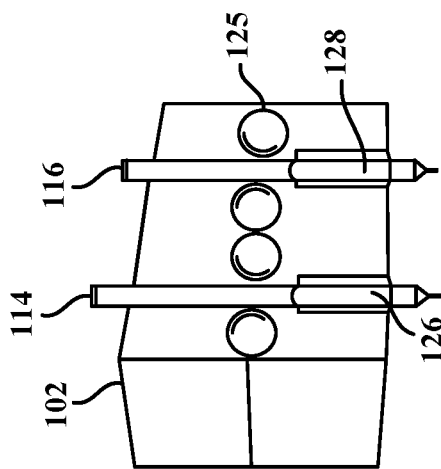
FIGS. 1A-B illustrate a diagram of a 3-D printer using fused deposition modeling (FDM).
Figure 1A:
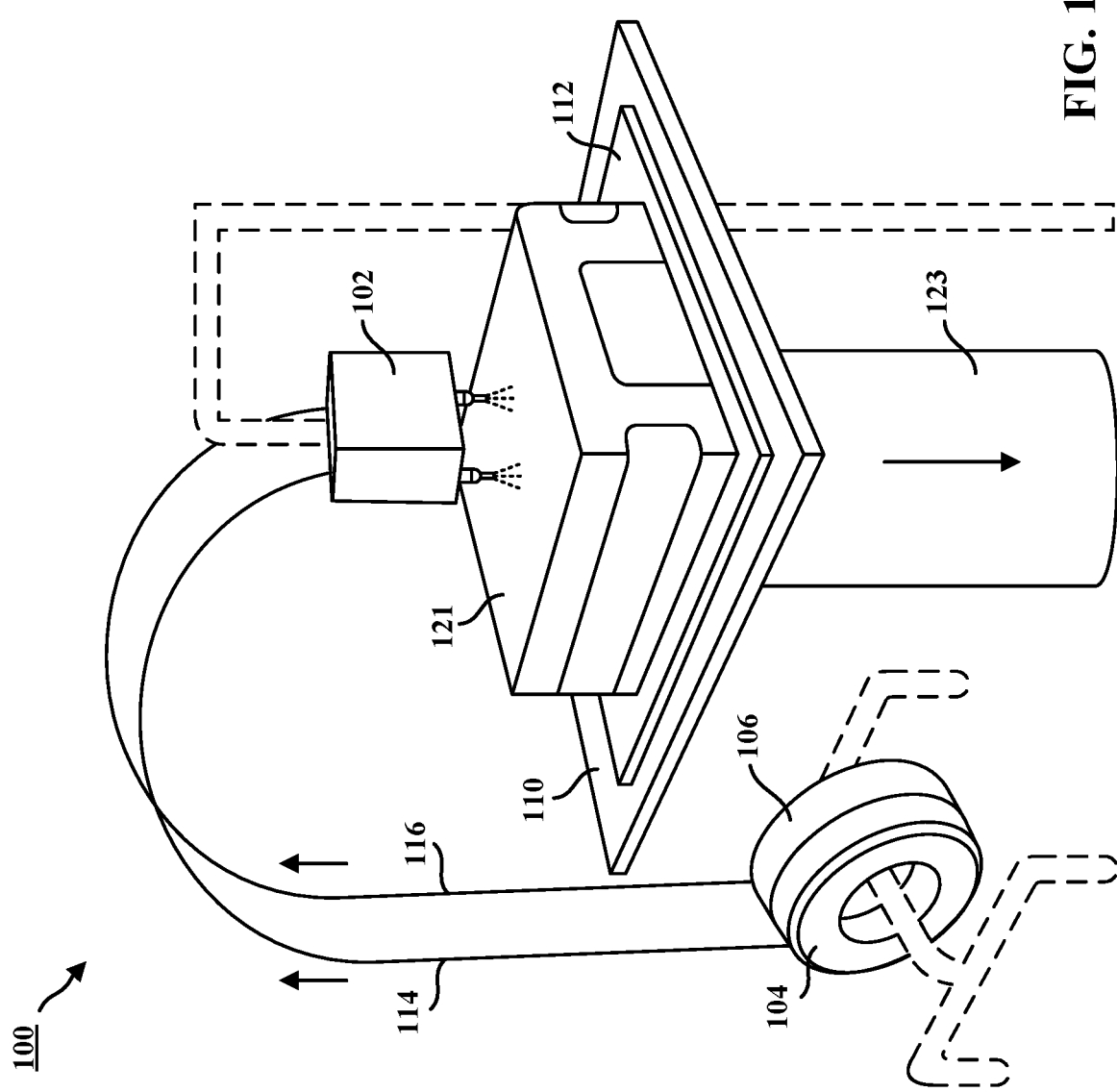

FIGS. 1A-B illustrate a diagram of a 3-D printer that may use fused deposition modeling (FDM). FDM is an additive manufacturing technique wherein a thermoplastic or other material, e.g., metal, may be extruded through a temperature-controlled print nozzle 102. The print nozzle 102 can be moved in both horizontal and vertical directions by a mechanical device that is under the control of a computer-aided manufacturing (CAM) software package. The 3-D part to be constructed is built one layer at a time, and the layers successively overlap each other in a prescribed manner to manufacture a part 121.

The 3-D printer of FIG. 1A also includes a first spool 104 for providing a first material 106 that is fed to the extrusion head 102 and a second spool for providing a second material that is fed to the extrusion head 102. While in some configurations the material 114 may constitute a build material for forming the successive layers of the part and the material 116 a support material for providing temporary support to accommodate spatial vacancies created by the predetermined shapes of certain structures whose shape may otherwise be compromised by gravity prior to solidifying, the 3-D printing techniques contemplated in this disclosure may obviate the need for a support material by using complex matrix arrays as backing structures.

3-D printer 100 may also include a substrate or base 112 upon which the printing may occur, and a vertically movable build platform 110. During the 3-D printing process wherein the material 114 is extruded onto a surface of part 121 to manufacture successive layers, the build platform 110 may be configured under software control to gradually move lower in the vertical direction (as indicated by the arrow on support arm 123) to accommodate the space occupied by the increasing number of layers of part 121.

FIG. 1B shows an expanded view of extrusion head 102. Materials 114 and 116 may be fed using rotating drive wheels 125 into extrusion nozzles 126 and 128, respectively. The materials 114 and 116 are melted by the application of heat in respective extrusion nozzles 126 and 128 and thereupon ejected under software control from the nozzles onto the substrate 110, or onto the layers previously disposed on the substrate.

While an FDM printing technique has been described here for illustration purposes, the disclosure herein is not so limited, and any suitable 3-D printing technique may be employed in connection with the description that follows.

In some aspects, the 3-D printer 100 of FIGS. 1A-1B may be an apparatus for forming a structure. The structure may include a first portion and a second portion. In an aspect, the first portion may have a first conical tip and the second portion may have a second conical tip. The structure may include a structural joint. The 3-D printer 100 may include a first receiver configured to receive the first portion. For example, the first receiver may be a first portion of the build platform 110. The 3-D printer 100 may include a second receiver configured to receive the second portion. For example, the second receiver may be a second portion of the build platform 110. The 3-D printer 100 may include a material receiver configured to receive material. For example, the head 102 may be the material receiver configured to receive material. The 3-D printer 100 may be computer controlled and may include a memory and at least one processor coupled to the memory. The processor may be configured to receive instructions for printing the structural joint. The instructions may be based on a data model of the structural joint. Additionally, the at least one processor may control printing of the structural joint based on the instructions, the printing comprising spray forming the material to produce the structural joint, the structural joint connecting the first portion to the second portion, including joining the first conical tip to the second conical tip.

In some aspects, the 3-D printer 100 of FIGS. 1A-1B may provide a means for receiving instructions for printing the structural joint. For example, the 3-D printer 100 may be processor controlled. The processor may provide the means for receiving instructions for printing the structural joint. The 3-D printer 100 may provide means for receiving the first portion and the second portion. In an aspect, the first portion may have a first conical tip and the second portion may have a second conical tip. For example, the build platform 110 may be the means for receiving instructions for printing the structural joint. The first portion and the second portion may be placed on the build platform 110. The 3-D printer 100 may provide means for receiving material. The means for receiving material be, for example, the head 102, the first spool 104, the second spool or other components of the 3-D printer 100. The 3-D printer 100 may provide a means for printing the structural joint based on the instructions. The printing may include spray forming the material to produce the structural joint. The structural joint may connect the first portion to the second portion. In an aspect, printing may include spray forming the material to produce the structural joint and rotating the first portion and the second portion during the spray forming.

Figure 2:
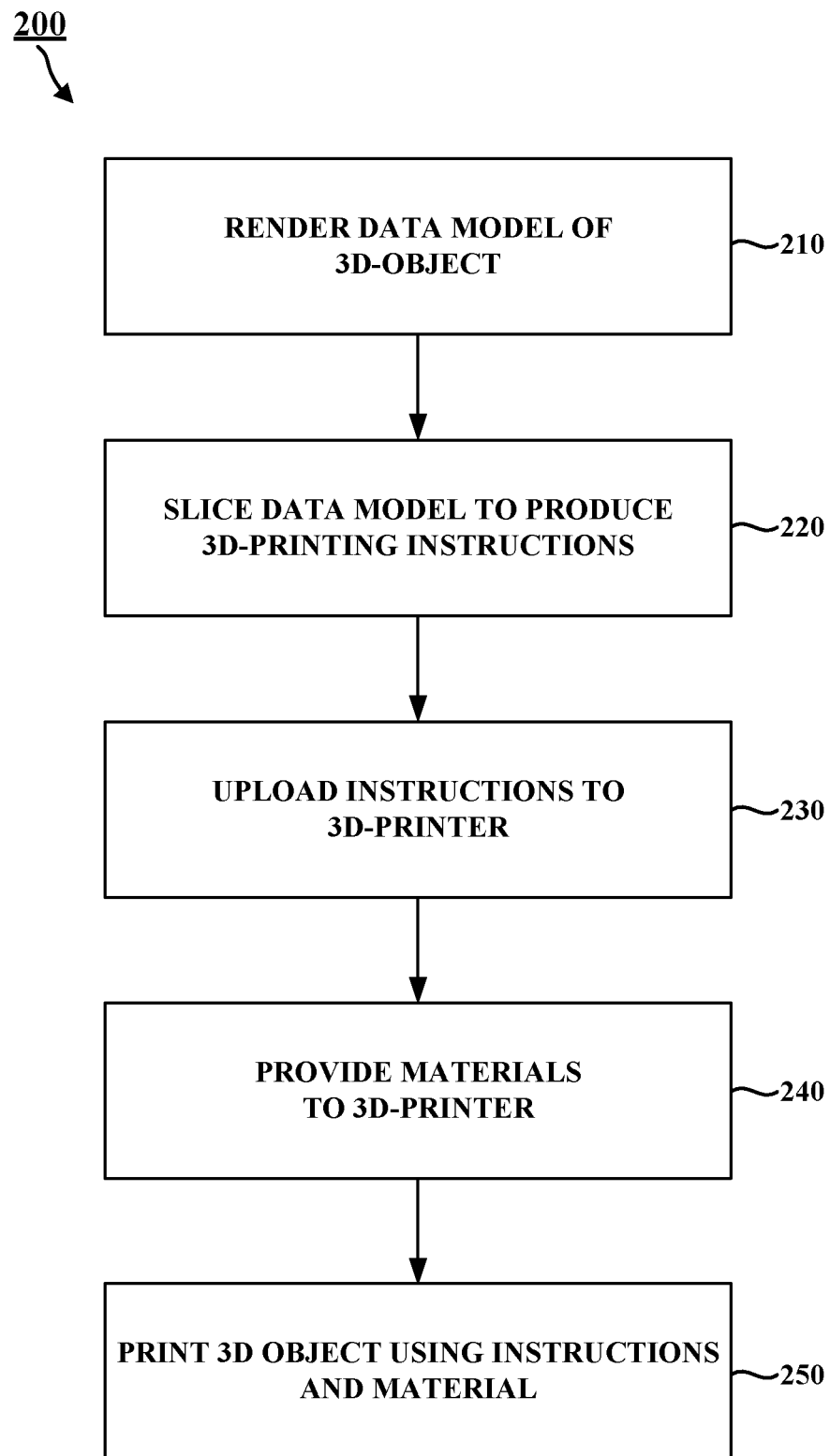
FIG. 2 is a flow diagram illustrating an exemplary process of 3-D printing.

FIG. 2 is a flow diagram 200 illustrating an exemplary process of 3-D printing. A data model of the desired 3-D object to be printed is rendered (step 210). A data model is a virtual design of the 3-D object. Thus, the data model may reflect the geometrical and structural features of the 3-D object, as well as its material composition. The data model may be created using a variety of methods, including 3-D scanning, 3-D modeling software, photogrammetry software, and camera imaging.

3-D scanning methods for creating the data model may also use a variety of techniques for generating a 3-D model. These techniques may include, for example, time-of-flight, volumetric scanning, structured light, modulated light, laser scanning, triangulation, and the like.

3-D modeling software, in turn, may include one of numerous commercially available 3-D modeling software applications. Data models may be rendered using a suitable computer-aided design (CAD) package, for example in an STL format. STL files are one example of a file format associated with commercially available CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 220).

Numerous slicer programs are commercially available. Generally, the slicer program converts the data model into a series of individual layers representing thin slices (e.g., 100 microns thick) of the object being printed, along with a file containing the printer-specific instructions for 3-D printing these successive individual layers to produce an actual 3-D printed representation of the data model.

A common type of file used for this purpose is a G-code file, which is a numerical control programming language that includes instructions for 3-D printing the object. The G-code file, or other file constituting the instructions, is uploaded to the 3-D printer (step 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 240). In fused deposition modeling (FDM) 3-D printers, as indicated above, materials may be loaded as filaments on spools, which are placed on one or more spool holders. The filaments are typically fed into an extruder apparatus which, in operation, heats the filament into a melted form before ejecting the material onto a build plate or other substrate. In selective laser sintering (SLS) printing and other methods, the materials may be loaded as powders into chambers that feed the powder to a build platform. Depending on the 3-D printer, other techniques for loading printing materials may be used.

The respective data slices of the 3-D object are then printed based on the provided instructions using the material(s) (step 250). In 3-D printers that use laser sintering, a laser scans a powder bed and melts the powder together where structure is desired and avoids scanning areas where the sliced data indicates that nothing is to be printed. This process may be repeated thousands of times until the desired structure is formed, after which the printed part is removed from a fabricator. In fused deposition modeling, as described above, parts are printed by applying successive layers of model and support materials to a substrate. In general, any suitable 3-D printing technology may be employed for purposes of this disclosure.

Like other 3-D printing techniques, the FDM technique has a minimum layer resolution, which may in some configurations be on the order of 0.127 mm or thereabouts, depending on the printer resolution and other factors. As a consequence of this minimum resolution, it becomes apparent that the attempted 3-D printing of an angled surface will result in often unwanted "stair-stepped" artifacts caused by the finite thickness of the successive layers.

Figure 3A:
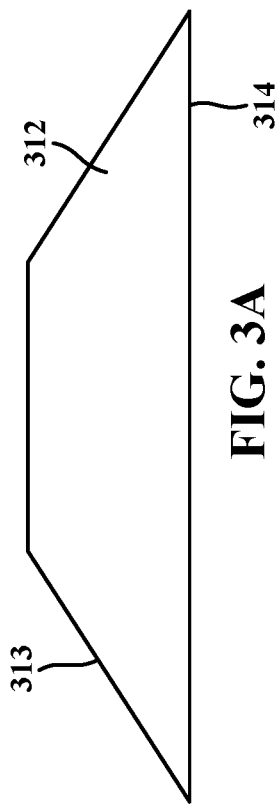
FIGS. 3A, 3B, and 3C are illustrations of a desired part and a build plate supporting a resulting 3-D printed part.
Figure 3B:
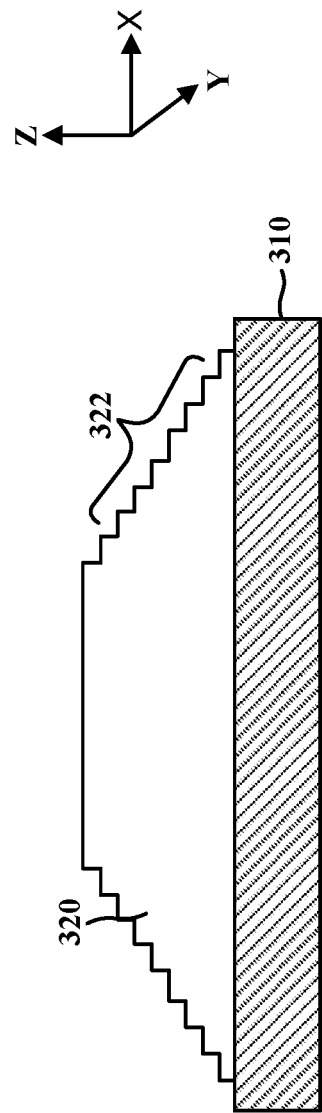
Figure 3C:
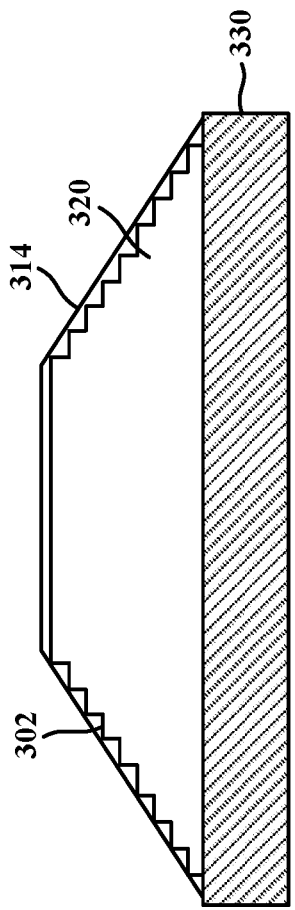

This phenomenon can be appreciated with reference to FIGS. 3A-C, which are illustrations of a desired part 312 and a build plate 310 supporting a resulting 3-D printed part 320. FIG. 3A is a visual representation of a data model of a part 312 to be printed. The part 312 for purposes of this illustration has a first surface 314 that is substantially flat and a second surface 313 that is angled on both ends and that has a flat top surface. The part 312 may, for example, be a panel for use in a transport structure where the surface 313 is intended to represent an exterior portion of the panel such as the external portion of a car door.

FIG. 3B shows part 320 that is 3-D printed on substrate 310 based on the data model of part 312. As can be seen, due to the finite minimal thickness of the layers being deposited, the 3-D printing process generates a stair-stepped effect 322 on the surface of part 320 that is intended to represent one of the angled surfaces 313 (FIG. 3A). As a result, the exterior surface of a part such as a body panel may have undesirable and unaesthetically pleasing jagged edges that must be smoothed out by some other process. Depending on the part being constructed and the specific implementation, the stair-stepped effect 322 that results may add further complications. For example, it may render the part non-compliant with specifications or applicable regulations, or non-functional for a particular purpose.

FIG. 3C shows the part 320 after going through an additional manufacturing step. In particular, the stair-stepped effect 322 is reduced to form substantially flat surfaces 202 and 304 of part 320. One such manufacturing step may involve workers removing part 320 from the 3-D printer, depositing part 320 on a second substrate 330 and applying a hand spray forming technique to smooth the stair-stepped effect.

Conventional spray forming involves casting metal components with homogeneous microstructures via the inert gas atomization of a liquid metal stream into droplets and the deposition of semi-solid sprayed droplets onto a shaped substrate. The substrate collects the droplets and solidifies them into a coherent preform. In one example of the process, an alloy is melted, normally in an induction furnace, then the molten metal is slowly poured through a conical tundish into a small-bore ceramic nozzle. The molten metal exits the furnace and is broken up into droplets by an atomizer. The droplets then proceed downwards to impact a substrate. The process is arranged such that the droplets strike the substrate while in the semi-solid condition. This process provides sufficient liquid fraction to 'stick' the solid fraction together. Deposition continues, gradually building up a spray formed part, such as a billet, of metal on the substrate. Spray forming may use a chamber in the shape of the part to be manufactured.

Spray forming may involve applying finishing procedures on metal structures as indicated above or forming metal structures in a chamber. More specifically, metal parts may be spray formed in a temperature controlled chamber, which is typically in a shape that is consistent with that of the final part. In current metal spray forming processes, dedicated equipment is needed such as the chamber, nozzle, atomizer, etc. In addition, the metal parts are limited by the constraints of the chamber and can only be shaped to substantially adhere to the geometry of the chamber.

Accordingly, in one embodiment, a spray forming technique is incorporated as part of a 3-D printer. The 3-D printer includes a flexible, computer-controlled nozzle having six degrees of freedom that is capable of being manipulated in all three X-Y-Z directions and inclined at a variety of angles relative to the printer build plate. The 3-D printer incorporating the spray former may, depending on the embodiment, be used for both for finishing of surfaces of existing parts and for wholesale construction of parts. In other exemplary embodiments, the spray forming 3-D printer is not limited to spray forming of metals and may additionally or alternatively employ spray forming of plastics and other materials, e.g., metal. Thus, the 3-D printer may incorporate a spray former that broadly includes one or more mechanical assemblies for converting a desired material into droplets and spray forming the material in a manner specified by the 3-D printing instructions and/or the CAM program associated with the 3-D printer.

Figure 4:
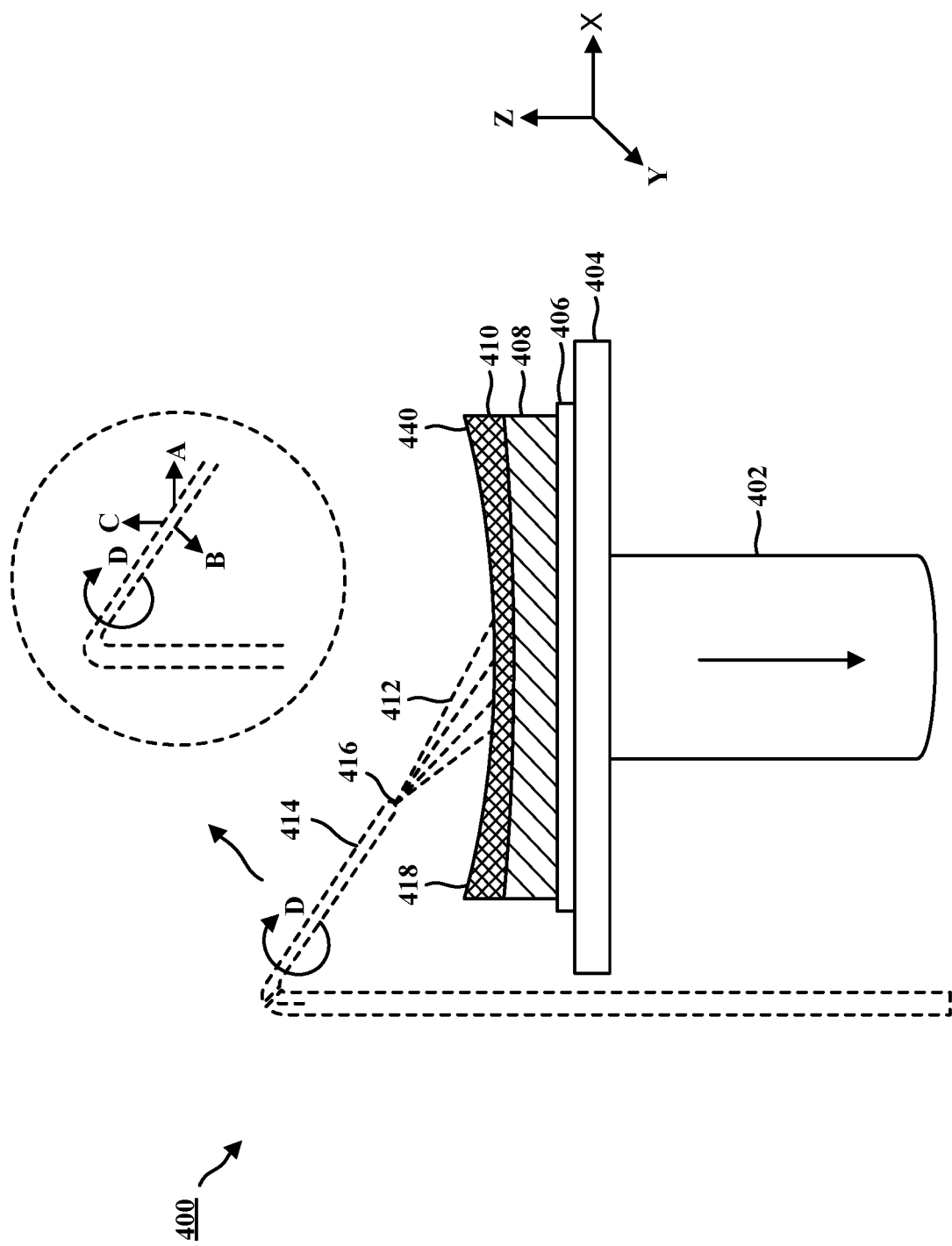
FIG. 4 is a diagram of a 3-D printer employing spray forming.

FIG. 4 shows a conceptual diagram of a 3-D printer 400 employing spray forming. The 3-D printer includes support arm 402, build plate 404, and substrate 406. In this embodiment, a tooling shell 408 is disposed on a surface of substrate 406. In one exemplary embodiment, the tooling shell 408 was previously machined or 3-D printed and was placed on the substrate 408 after its construction.

In another exemplary embodiment as described further below with reference to FIGS. 5 and 6, the tooling shell 408 may be 3-D printed on 3-D printer 400. For example, 3-D printer 400 may include a conventional computer-controlled print extruder (not shown) which may 3-D print the mold using any of a variety of known methods (SLS, FDM, etc.). In another exemplary embodiment, the mold is spray formed using 3-D printer 400.

A robotic arm 414 under computer control of the 3-D printer may be used to spray form a part 410, such as a panel, on a surface of the tooling shell 408. In other exemplary embodiments, the spray forming is deposited directly on substrate 406 to spray form the part 410. The nozzle 416 of the robotic arm 414 shoots droplets 412 of material onto the tooling shell 408 to thereby create the part 410 as described above.

As the part 410 is formed by the 3-D printer using spray forming, it will be appreciated that the angled or inclined sections 418 and 420 of part 410 can be created without any appreciable stair-stepped effect. Accordingly, the use of spray forming as part of, and under computer control of, the 3-D printer enables a manufacturer to form a part 410 that requires no further finishing step. Accordingly, a smoothened part may be provided in a single step or on a single 3-D printer.

In an exemplary embodiment, robotic arm 414 can be manipulated in a variety of directions and angles. For example, robotic arm 414 may be moved in one or more of the A, B or C directions (or directions at any point in between), which may correspond respectively to coordinate axes X, Y, Z of the 3-D printer. For example, in another exemplary embodiment, robotic arm 414 can be inclined at substantially any angle in order to perform spray forming at a variety of angles. In yet another embodiment, robotic arm 414 may be configured to rotate or twist as shown by the arrow and corresponding designation D. In an exemplary embodiment, the robotic arm 414 is equipped with six degrees of freedom. In one embodiment, the robotic arm 414 is designed to be thin relative to the generally bulky print extruder 502 and associated mechanical assembly. This gives the robotic arm 414 additional flexibility to move about the substrate.

Conventional 3-D printers that perform plastic extrusion generally have a limited ability to alter angles of the print extruder. Such conventional printers typically employ a pivot point for the print nozzle in lieu of a thin, flexible robotic arm. For this reason, the extruders on 3-D printers typically do not have the six degrees of freedom such that they can have significant flexibility in their degrees of movement. One reason for this limitation is that conventional print nozzles typically have thicker diameters and cannot be manipulated easily about different axes, in contrast to the sleek robotic arm 414, whose range of diameters may be made very thin due in part to the intrinsic nature of the spray forming technique and the small size of droplets required from the spray nozzle.

In addition, due to the thickness of the extruded material and other constraints, material extruded from conventional printers may be adversely affected by gravity when the extruder angle is changed, for example, to a slightly angled position to deposit material. That is, the print extruder in the conventional 3-D printer is often bulky, carries more inertia, and is limited in motion due to its pivot point connection to the remainder of the extrusion system, so that its flexibility to change angles and directions are accordingly limited. This phenomenon is similar in principle to attempting to write upside down with a ballpoint pen. 3-D printing using spray forming lacks this limitation. The spray forming technologies enables the 3-D printer to spray the light droplets on the substrate or part at essentially any angle, including in an upward direction, and the spray mechanic is not substantially adversely affected by gravity.

Because the robotic arm 414 and spray forming capability is incorporated as part of the 3-D printer, the arm 414 can be controlled and directed under computer control using instructions provided directly to the 3-D printer. In addition, in contrast to the conventional spray forming method wherein a chamber constrains the part formation to adhere to a single or a limited geometry, the 3-D printer as disclosed herein can spray form parts in three dimensions, with such parts having a variety of possible geometries and features under software control.

The mechanical assembly of the robotic arm 414 and printer may vary depending on the embodiment. Where spray forming of metals is performed, the assembly may incorporate a mechanism for heating the metal, an atomizer, and other elements. In another embodiment, robotic arm 414 of the 3-D printer may be configured to spray resins onto a mold or a substrate for forming or finishing parts. Generally, in considering the spray forming of different types of materials, molten materials should not be overly viscous to thereby render them too difficult for nozzle 416 to eject the droplets. Accordingly, in an exemplary embodiment, nozzle 416 of robotic arm 414 may include an assembly for adjusting the viscosity of the target material to be used in the spray forming process. In one embodiment, the assembly may be dynamically adjusted according to software as a function of the material to be used in the spray forming process. In addition, for plastics, a heating mechanism may be included in or proximate to nozzle 416 for facilitating the flow of the material.

Where thermoset resins are used, the resin and the hardener are generally mixed in some ratio and then applied. Pre-mixing the resin and the hardener and then attempting to spray form the resulting viscous material gives rise to inherent difficulties. For example, pre-mixing the resin and hardener and spray forming the combined material may cause the material to cure within the nozzle, thereby clogging the nozzle.

Accordingly, in another exemplary embodiment, robotic arm 414 may include two nozzles 416 (only one shown), each which constitutes a separate spray forming head. A first such nozzle may spray the resin and the second nozzle may spray the hardener. This technique obviates the difficulties inherent in pre-mixing and spraying the combined resin and hardener.

The above-described 3-D printing techniques can be used either to smooth (finish) a part such as a panel using spray forming or to create a part.

In spray forming plastics, the diameter of the nozzle 416 is generally very small, in some embodiments being on the order of approximately 50 µm. Because the diameter of nozzle 416 is small, the corresponding thickness of the material exiting nozzle 416 may be negligible, such that substantially no stair-stepped effect is observed when 3-D printing parts using the spray forming technique.

The robotic arm 414 is advantageous for incorporation into the 3-D printer 400 for use in spray forming because, among other reasons, such robotic assemblies may be controlled by a data model and related instructions as are used in 3-D printers.

Referring back to FIG. 4, in an example where the part 410 to be formed constitutes an exterior body panel of a vehicle, the material forming the panel can be sprayed over the 3-D printed tooling shell 408 (or the substrate 406 in other embodiments). In this manner, imperfections that arise due to surface properties of the 3-D printed tooling shell 408 are present only on the B side of the final panel where the part 410 meets the surface of tooling shell 408. In contrast, the A side (surface 418, 420 of part 410) of the panel may be made to be substantially flawlessly smooth, thereby satisfying Class A vehicular surface requirements.

In another exemplary embodiment, the 3-D printer as described above can be used to spray resin on metal or plastic 3-D printed tools to smoothen the surface of the tools.

In the embodiments involving spray forming of metals, various techniques and processes may be suitable for use in conjunction therewith including plasma deposition, physical vapor deposition, chemical vapor deposition, and the like.

Using the techniques described herein, smooth metal or plastic parts having complex geometries can be spray formed from the ground up under software control of the printers. Layers can be sprayed from a build plate 404 or, alternatively, a first material can be used as a base 406 and a second material can be used for the spray forming process. In some aspects of the systems and methods described herein, spray forming may be used to manufacture structural joints.

In another exemplary embodiment, a spray forming mechanism is integrated with a conventional 3-D print extruder to manufacture a single 3-D printer. The 3-D printer according to this exemplary embodiment is capable of dual (or multiple) functions; namely, a conventional extruder (such as SLS, FDM, etc.) can be used to 3-D print a part and a spray former can be used either to manufacture parts or to provide finishing for the part printed by the conventional print extruder. Thus, spray forming may be used to manufacture various structures. Spray forming may also be used to manufacture structural joints, including forming structural joints using structures that have also been spray formed.

In some aspects, the 3-D printer 400 of FIG. 4 may be an apparatus for forming a structure. The structure may include a first portion, a second portion, and a structural joint, the apparatus. The 3-D printer 400 may include a first receiver configured to receive the first portion. In an aspect, the first portion may have a first conical tip. For example, the first receiver may be a first portion of the build plate 404. The 3-D printer 400 may include a second receiver configured to receive the second portion. In an aspect, the second portion may have a second conical tip. For example, the second receiver may be a second portion of the build plate 404. The 3-D printer 400 may include a material receiver configured to receive material. For example, the nozzle 416 may take received material and spray the material to print the structural joint. The 3-D printer 400 may be computer controlled and may include a memory and at least one processor coupled to the memory. The processor may be configured to receive instructions for printing the structural joint. The instructions may be based on a data model of the structural joint. Additionally, the at least one processor may control printing of the structural joint based on the instructions, the printing comprising spray forming the material to produce the structural joint, the structural joint connecting the first portion to the second portion.

In some aspects, the 3-D printer 400 of FIGS. 4A-4B may provide a means for receiving instructions for printing the structural joint. For example, the 3-D printer 400 may be processor controlled. The processor may provide the means for receiving instructions for printing the structural joint. The 3-D printer 400 may provide means for receiving the first portion and the second portion. In an aspect, the first portion may have a first conical tip and the second portion may have a second conical tip. For example, the build plate 404 may be the means for receiving instructions for printing the structural joint. The first portion and the second portion may be placed on the build plate 404. The 3-D printer 400 may provide means for receiving material. The means for receiving material be, for example, the nozzle 416 or other components of the 3-D printer 400. The 3-D printer 400 may provide a means for printing the structural joint based on the instructions. The printing may include spray forming the material to produce the structural joint. The structural joint may connect the first portion to the second portion.

Figure 5:
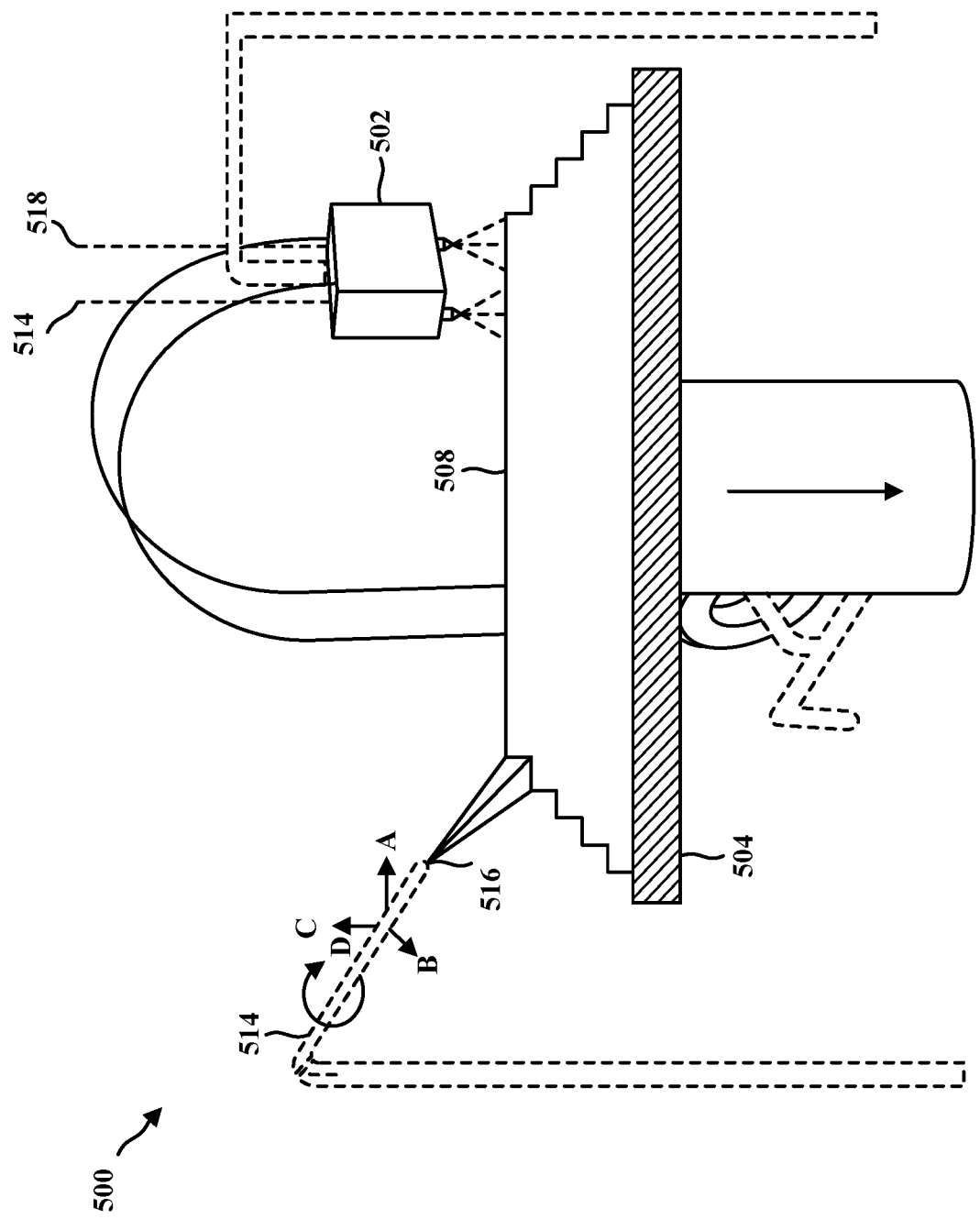
FIG. 5 is a diagram of a 3-D printer integrating spray forming and fused deposition modeling (FDM) printing.

FIG. 5 shows a diagram of a 3-D printer 500 integrating spray forming and FDM printing capability. While an FDM assembly is shown for purposes of illustration, it will be appreciated that any conventional 3-D printing technique may be integrated with the spray forming mechanism. The spray forming mechanism includes robotic arm 514, nozzle 516, and associated control mechanism (not shown) guided by printer software. As previously shown with reference to FIG. 4, robotic arm 514 of FIG. 5 may be under control of the 3-D printer instructions and can be manipulated at a variety of angles and directions, including in the A, B, C, and D directions.

In the embodiment shown, part 508 is 3-D printed on build plate 504 (or an intervening substrate or foam base) using print extruder 502 and one or both of print materials 514 and 518. As discussed in connection with previous embodiments, the angled portions of part 508 are characterized by a stair-stepped effect, the scale of which is exaggerated here for clarity. After part 508 is 3-D printed via print extruder 502, nozzle 516 of robotic arm applies spray forming to finish the part and thereby reduce or eliminate the stair-stepped effect, such that part 508 will have smooth angled surfaces as noted previously with reference to FIGS. 3A and 3C. Depending on the embodiment, metals, plastics, or composites may be spray formed.

Figure 6A:
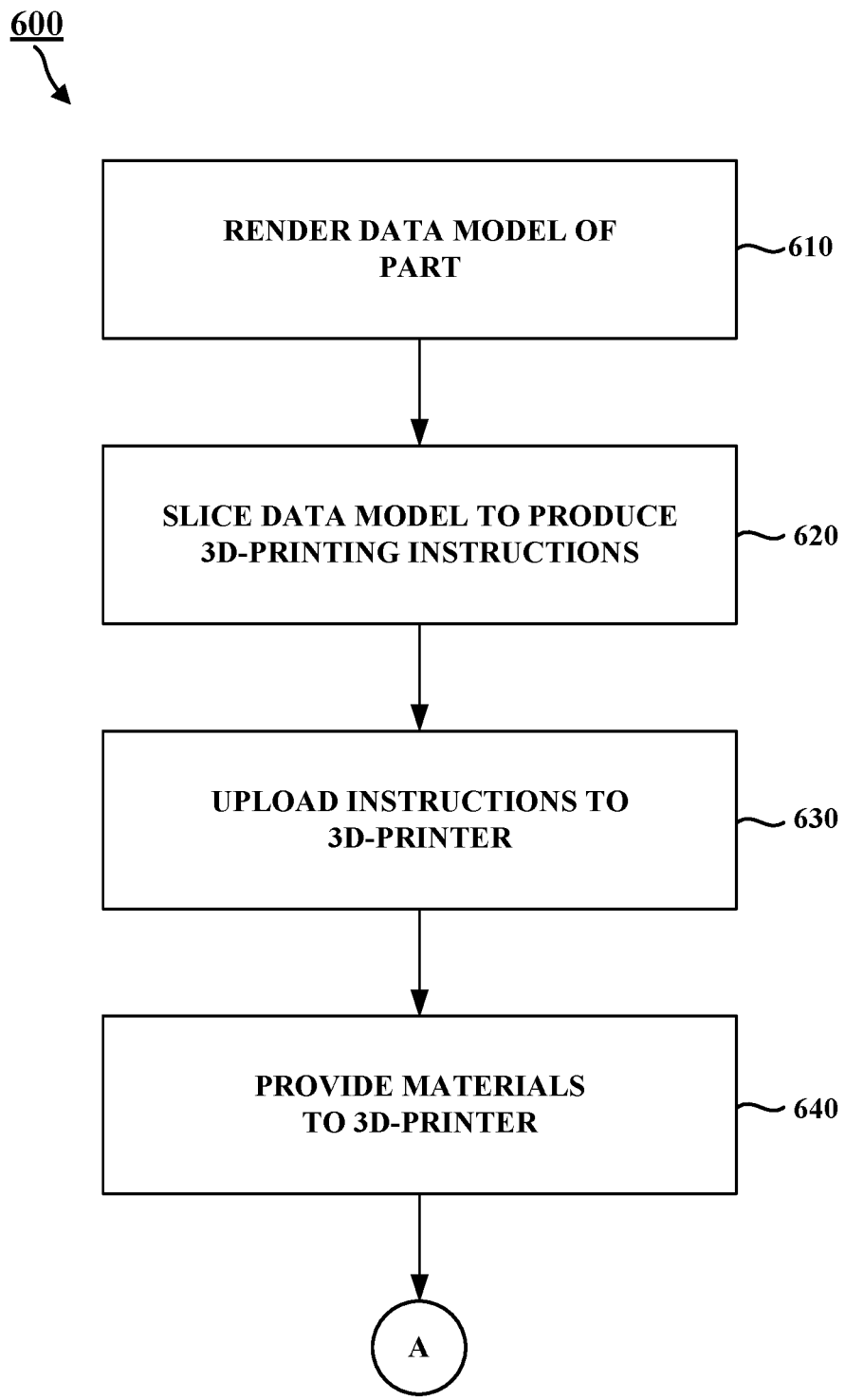
FIGS. 6A-B are a flow diagram illustrating an exemplary method for 3-D printing using spray forming.
Figure 6B:
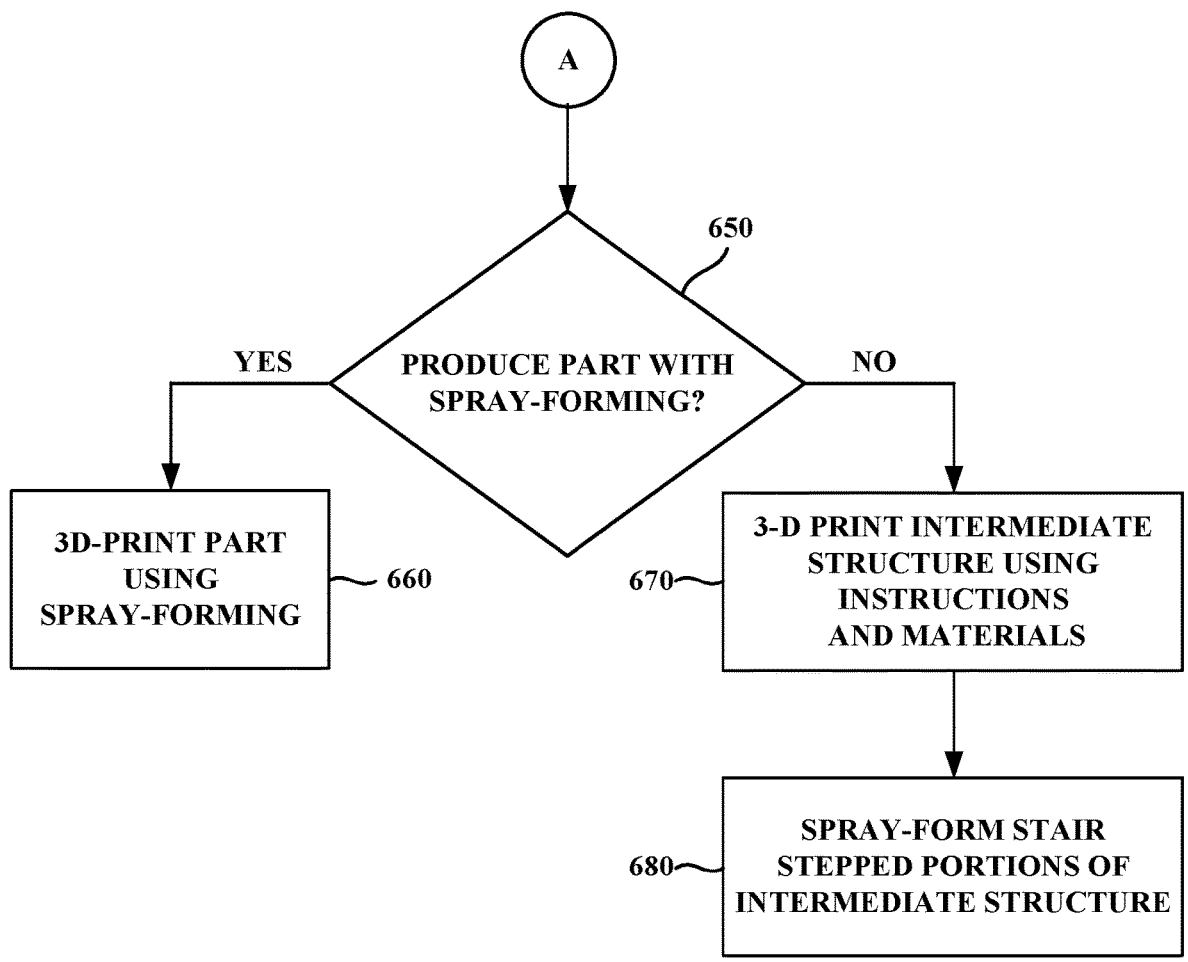

FIGS. 6A-B are a flow diagram 600 illustrating an exemplary method for 3-D printing using spray forming. Referring to FIG. 6A, at 610, a data model of the part to be printed is rendered. At 620, the data model is sliced into a plurality of layers to produce 3-D printing instructions. Depending on the application, these instructions may include instructions for conventional 3-D printing (such as SLS or FDM), spray forming, or both. At 630, the instructions are uploaded to the 3-D printer.

At 640, materials are provided to the 3-D printer 500 for use in 3-D printing the object. These materials may include one or more of plastics, metals, resins, and composites in their appropriate form for use in the specific 3-D printing technique employed. This step may also include providing materials for use in spray forming a part. In an exemplary embodiment, the materials are provided to different functional mechanisms within the 3-D printer. In other embodiments, the spray forming mechanism may draw its material from a common source as the conventional 3-D print head. It should be noted that step 640 need not occur in any particular order, and may occur prior to any of the steps 610-630 or later, as long as the material is made available at the actual time of printing the part.

Referring to FIG. 6B, at 650, the 3-D printer 500 may determine, based on the instructions, whether the part to be produced will be manufactured via spray forming (as in the application of material via robotic arm 514 and nozzle 516 in FIG. 5) or via a conventional 3-D printing technique (as in the application of one or more materials 514, 518 via print extruder 502 in FIG. 5). If it is determined that the part will be spray formed, then at 660, the 3-D printer 500 will form the part on substrate 504 or on another base plate. Conversely, if it is determined that the part will be 3-D printed using the conventional print extruder 502, then at step 670 the 3-D printer 500 will proceed to deposit successive layers onto the substrate until part 508 is formed. It will be appreciated that the angled portions of part 508 may include the stair-stepped effect as previously described.

In an exemplary embodiment, after the part 508 is printed using the 3-D print extruder 502 (FIG. 5), then at 680, the 3-D printer 500 may spray form the surface of part 508, including the stair-stepped portions, to finish the part and thereby smoothen the angled portions of part 508. In this exemplary embodiment, the part 508 printed using conventional means constitutes an intermediate structure that is finished using the spray form portion of 3-D printer 500. In another exemplary embodiment and depending on the instructions provided to 3-D printer 500, the robotic arm 514 may contemporaneously provide finishing on portions of intermediate structure 508 while the print extruder 502 is depositing layers of material. In another exemplary embodiment, based on a different set of instructions, 3-D printer 500 may 3-D print the structure 508 in part using print extruder 502 and in part using spray forming via robotic arm 514 and nozzle 516.

While for purposes of clarity the robotic arm 514 is shown to be small in scale relative to build plate 504 and the part 508, in other embodiments robotic arm 514 may be constructed in any flexible manner. For example, robotic arm 514 may be longer, have a wider range, and have a more flexible geometry to enable it to spray form the part 508 from all angles, or a wide range of angles including an inverted angle relative to the floor.

Figure 7:
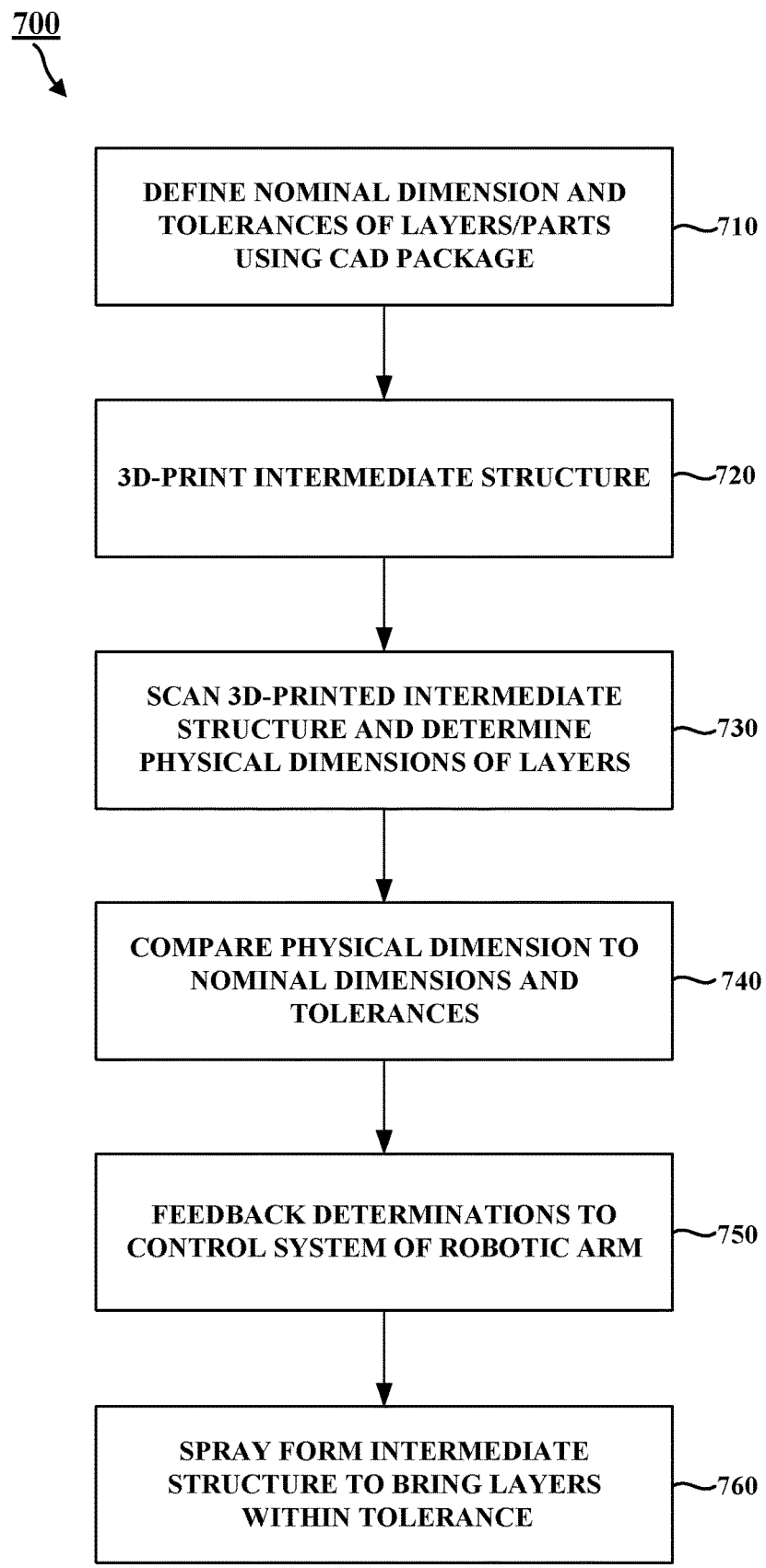
FIG. 7 is a flow diagram illustrating an exemplary method for 3-D printing using in situ monitoring of stair-stepped effects of the 3-D printed structure.

In another exemplary embodiment shown in the flowchart 700 of FIG. 7, the 3-D printer employs in situ monitoring of stair-stepped effects or other variations of a 3-D printed structure. During programming using the CAD models or another suitable software technique, nominal dimensions and tolerances of one or more layers constituting the structure may be defined (step 710). For example, a nominal dimension of a layer thickness (at an edge or otherwise) may be defined along with a corresponding tolerance of deviation from the nominal dimension. As an illustration, if a nominal thickness for a particular layer is one inch, a corresponding tolerance may be +/−0.005 inches, or any suitable number. Other dimensions may be similarly defined. For example, a specified nominal dimension of an angle or contour of an inclined surface of the structure may be defined along with a corresponding tolerance for the angle or contour.

The 3-D printer prints an intermediate structure (step 720). The 3-D printer may scan the printed intermediate structure and thereby determine the actual physical dimension at issue, such as the thickness of the layers, the measurement of stair-stepped effects in an angled portion, etc. (step 730). In one exemplary embodiment, the scanning is performed after the 3-D printed intermediate structure is rendered. In another exemplary embodiment, the scanning is performed in real time while the intermediate structure is being printed. Having received the actual physical dimension(s) at issue, the 3-D printer and/or its control system or associated software application may compare the determined physical dimension(s) to the nominal dimension(s) and the respective tolerance(s) (step 740).

The 3-D printer may then provide feedback to the control system of the robotic arm, such as, for example, when the determined physical dimensions fall outside the tolerance of the identified nominal dimensions (step 750). Using this feedback, the 3-D printer may spray form the intermediate structure to provide material to bring the affected layers and/or structures within the specified tolerances (step 760). Thus, for example, the spray former may smooth out rough edges and/or add thickness to portions of the structure. Depending on the embodiment, the spray forming may be performed in real time during the 3-D printing of the intermediate structure (using an FDM, SLS or another technique). Alternatively, the spray forming may be performed after the intermediate structure is complete.

Various structures, including structures manufactured as described with respect to FIGS. 2, 6A-6B, 7, and/or other manufacturing methods may be joined together using the systems and methods described herein. For example, spray forming may be used to manufacture structural joints.

FIGS. 8-12 are diagrams illustrating examples of using spray forming to manufacture structural joints. For example, some aspects may use cold spray forming to manufacture structural joints. Coldspray forming may generally be an additive manufacturing process by spraying one or more materials to form a manufactured article. With the coldspray manufacturing process, a material being deposited may be kept below the material's melting point. The material being deposited may be sprayed at a base material at a speed high enough to induce solid state welding on impact. The material may be sprayed using a nozzle, e.g., a cold spray nozzle. Cold spray may be used to deposit a metal (or metal alloy, plastics, ceramics, or mixtures thereof) joint to join, for example, a number of off-the-shelf parts or manufactured parts such as extruded parts, 3-D printed parts, cold spray 3-D printed parts, or other manufactured parts. While most, if not all, off-the-shelf parts are manufactured, as used herein, manufactured parts may generally refer to parts manufactured locally or specifically to be joined using the systems and methods described herein. The manufactured parts may be manufactured in an area, e.g., building, where the systems and methods described herein are implemented. The parts may be manufactured using 3-D printing and/or 3-D cold spray printing, or other manufacturing technologies.

The off-the-shelf parts or manufactured parts may be held by brackets, struts, braces, or other supports. The off-the-shelf parts or manufactured parts may be held by robotic arms or may be moved to the brackets, struts, braces, or other supports using one or more robotic arms. One part (off-the-shelf part or manufactured part) may be held by brackets, struts, braces, or other supports while a second part may be held by a robotic arm or arms. The parts may be held such that the parts are touching. For example, the parts may be held by brackets, struts, braces, or other supports such that the parts are touching. The parts may be held by one or more robotic arms such that the parts are touching. The parts may be held by some combination of brackets, struts, braces, other supports, or robotic arms such that the parts are touching.

In an aspect, surfaces on the parts may be modified to allow, permit, or improve adherence of a cold spray metal (or metal alloy) deposit. For example, touching surfaces of the parts may be prepared to improve adherence of a cold spray metal deposit.

In an aspect, composite materials, e.g., carbon fiber composite materials, may be connected by a cold spray process. In such an aspect, the surfaces of components of the composite material may need to be prepared for connection to other components. These components may include other components made from composite materials, e.g., carbon fiber composite materials, or other materials, e.g., metals, or other materials that may be bonded using cold spray techniques. The preparing of the composite material may be needed so that the composite material may satisfactorily adherence to cold spray deposits. An exemplary surface preparation operation may include a metallization of the composite material. In a metallization of the composite material, a thin layer of metal is applied to the regions of the composite parts intended to adhere or bond to the cold spray deposit.

In an aspect, a vertical assembly cell may be used. A vertical assembly cell is described below with respect to FIG. 14. The vertical assembly cell may increase degrees of freedom and allows access for the cold spray gun to deposit metal at each site of contact between two pieces.

In an aspect, cold spray gun or guns may additively build up a structural joint which may strongly adhere to the parts. For example, when a gap exists between the parts, a cold spray gun or guns may additively build up one or both of the parts to close the gap between the parts. The cold spray gun or guns may additively build up a structural joint which may then join the parts.

In an aspect, multiple materials may be used with the systems and methods described herein, e.g., such as multiple metals or metal alloys. The metals (metal alloys or both) may need to be selected to allow strong adherence of cold spray deposits. In an aspect, a first metal (or metal alloy) may need to adhere to a second metal (or metal alloy) that contacts and needs to be connected to, e.g., using cold spray (of a metal or metal alloy). One metal may be connected to another metal using one or more intermediate metals, e.g., when each metal that contacts may adhere to each other.

Gaps between two or more parts to be joined may be built up through cold spray deposition until the cold spray deposit is in physical contact with both parts. As used herein, one part may be referred to as a first portion and a second part may be referred to as a second portion. The two (or more) parts may be coupled together using the systems and methods described herein to manufacture a structure.

Figure 8:
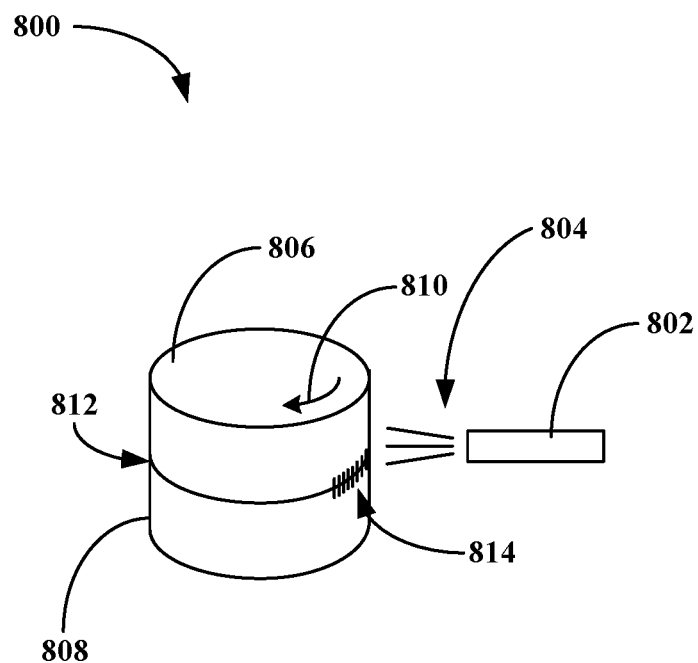
FIG. 8 is a diagram illustrating one example of using spray forming to manufacture a structural joint.

FIG. 8 is a diagram illustrating one example of using spray forming to manufacture a structural joint 814. A structure 800 may include a first portion 806, a second portion 808, and the structural joint 814. The structural joint 814 may be formed at the tips of the first portion 806 and the second portion 808 at a location 812 where the first portion 806 and the second portion 808 meet.

The structural joint 814 may be formed between the first portion 806 and the second portion 808 using a nozzle 802 of a spray forming device as discussed with respect to the 3-D printing devices 100, 400 of FIGS. 1A-1B and 4. The nozzle 802 may spray the spray form material 804, e.g., metal (or metal alloy). The spray form material may be a metal that is compatible with each material of the first portion 806 and the second portion 808. For example, the first portion 806, the second portion 808, and the spray form material 804 may be compatible metals. In one aspect, the first portion 806 and the second portion 808 may be made from the same metal (or metal alloy) and the spray form material 804 may be a metal (or metal alloy) compatible with the metal or metal allow of the first portion 806 and the second portion 808.

In an aspect, the first portion 806 and the second portion 808 may be rotated as indicated by an arrow 810. Accordingly, the structural joint 814 may be formed around the entire first and second portions 806, 808 as the first portion 806 and the second portion 808 are, for example, rotated 360 degrees.

The structural joint 814 may be manufactured based on instructions. The instructions may be based on a data model of the structural joint 814. The data model may include materials such as a metal or metals, an alloy or alloys for the first portion 806, the second portion 808, the spray form material 804, or a combination of the first portion 806, the second portion 808, or the spray form material 804. The data model may include a temperature for the spray form material 804. The data model may include sizes of the first portion 806 and the second portion 808, e.g., to that the first portion 806 and the second portion 808 may be positioned. The data model may include other attributes of the first portion 806, the second portion 808, the spray form material 804, or a combination of the first portion 806, the second portion 808, or the spray form material 804. The other attributes may include, but are not limited to, for example, surface finish, temperature of the parts during the cold spray process, tolerances, orientation of the parts, cold spray process parameters. Instructions may be developed based on the data model. Accordingly, the structural joint 814 may be printed based on the instructions. The printing may include spray forming the material to produce the structural joint 814. The structural joint 814 may connect the first portion 806 to the second portion 808.

Figure 9:
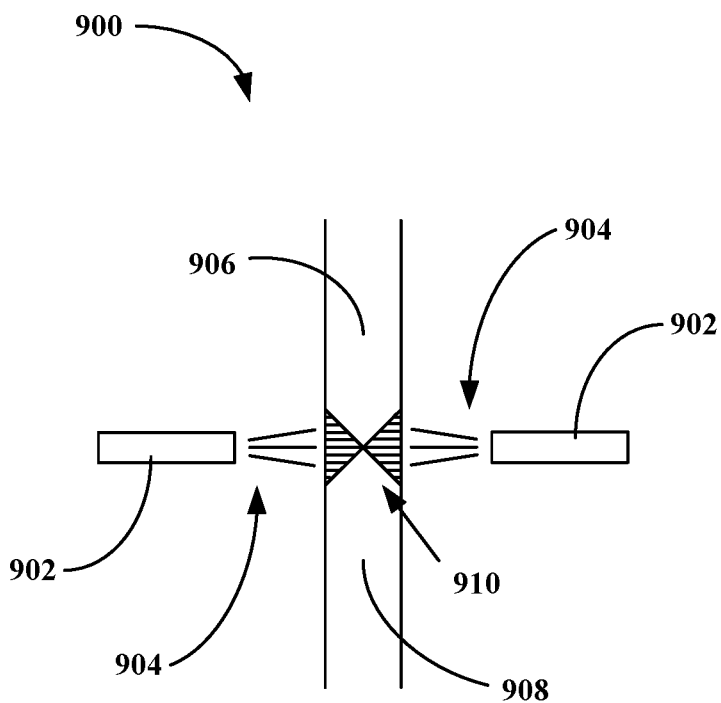
FIG. 9 is a diagram illustrating another example of using spray forming to manufacture a structural joint.

FIG. 9 is a diagram illustrating another example of using spray forming to manufacture a structural joint 910. A structure 900 may include a first portion 906, a second portion 908, and the structural joint 910. The structural joint 910 may be formed at tips of the first portion 906 and the second portion 908 at a location (of structural joint 910) where the first portion 906 and the second portion 908 meet. In the example of FIG. 9, the tip of the first portion 906 and the tip of the second portion 908 may be conical. The conical tips may allow for spray form material to fill in conical tips.

The structural joint 910 may be formed between the first portion 906 and the second portion 908 using nozzle 902 of a spray forming device as discussed with respect to the 3-D printing devices 100, 400 of FIGS. 1A-1B and 4. The nozzles 902 may spray the spray form material 904, e.g., metal (or metal alloy). The spray form material may be a metal that is compatible with each material of the first portion 906 and the second portion 908. For example, the first portion 906, the second portion 908, and the spray form material 904 may be compatible metals. In one aspect, the first portion 906 and the second portion 908 may be made from the same metal (or metal allow) and the spray form material 904 may be a metal (or metal alloy) compatible with the metal or metal allow of the first portion 906 and the second portion 908.

The structural joint 910 may be manufactured based on instructions. The instructions may be based on a data model of the structural joint 910. The data model may include materials such as a metal or metals, an alloy or alloys for the first portion 906, the second portion 908, the spray form material 904, or a combination of the first portion 906, the second portion 908, or the spray form material 904. The data model may include a temperature for the spray form material 904. The data model may include sizes of the first portion 906 and the second portion 908, e.g., to that the first portion 906 and the second portion 908 may be positioned. The data model may include other attributes of the first portion 906, the second portion 908, the spray form material 904, or a combination of the first portion 906, the second portion 908, or the spray form material 904. Instructions may be developed based on the data model. Accordingly, the structural joint 910 may be printed based on the instructions. The printing may include spray forming the material to produce the structural joint 910. The structural joint 910 may connect the first portion 906 to the second portion 908.

Figure 10:
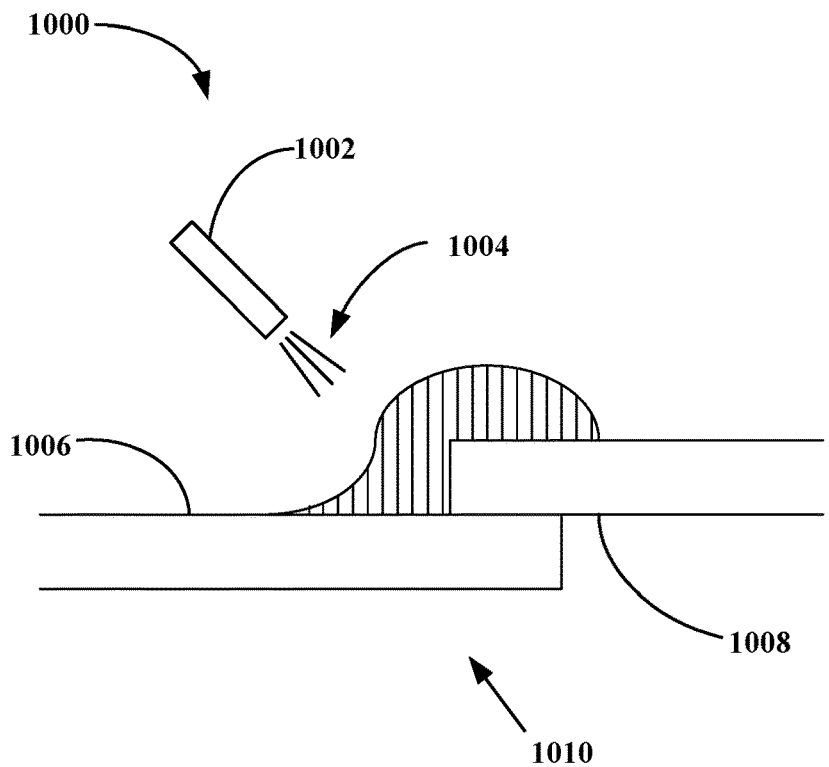
FIG. 10 is a diagram illustrating another example of using spray forming to manufacture a structural joint.

FIG. 10 is a diagram illustrating another example of using spray forming to manufacture a structural joint 1010. A structure 1000 may include a first portion 1006, a second portion 1008, and the structural joint 1010. The structural joint 1010 may be formed between the first portion 1006 and the second portion 1008 at a location (of structural joint 1010) where the first portion 1006 and the second portion 1008 meet. In the example of FIG. 10, the first portion 1006 and the second portion 1008 may run parallel or nearly parallel to each other. The first portion 1006 and the second portion 1008 may meet along sides of each the first portion 1006 and the second portion.

The structural joint 1010 may be formed between the first portion 1006 and the second portion 1008 using nozzle 1002 of a spray forming device as discussed with respect to the 3-D printing devices 100, 400 of FIGS. 1A-1B and 4. The nozzles 1002 may spray the spray form material 1004, e.g., metal (or metal alloy). The spray form material may be a metal that is compatible with each material of the first portion 1006 and the second portion 1008. For example, the first portion 1006, the second portion 1008, and the spray form material 1004 may be compatible metals. In one aspect, the first portion 1006 and the second portion 1008 may be made from the same metal (or metal allow) and the spray form material 1004 may be a metal (or metal alloy) compatible with the metal or metal allow of the first portion 1006 and the second portion 1008.

The structural joint 1010 may be manufactured based on instructions. The instructions may be based on a data model of the structural joint 1010. The data model may include materials such as a metal or metals, an alloy or alloys for the first portion 1006, the second portion 1008, the spray form material 1004, or a combination of the first portion 1006, the second portion 1008, or the spray form material 1004. The data model may include a temperature for the spray form material 1004. The data model may include sizes of the first portion 1006 and the second portion 1008, e.g., to that the first portion 1006 and the second portion 1008 may be positioned. The data model may include other attributes of the first portion 1006, the second portion 1008, the spray form material 1004, or a combination of the first portion 1006, the second portion 1008, or the spray form material 1004. Instructions may be developed based on the data model. Accordingly, the structural joint 1010 may be printed based on the instructions. The printing may include spray forming the material to produce the structural joint 1010. The structural joint 1010 may connect the first portion 1006 to the second portion 1008.

Figure 11:
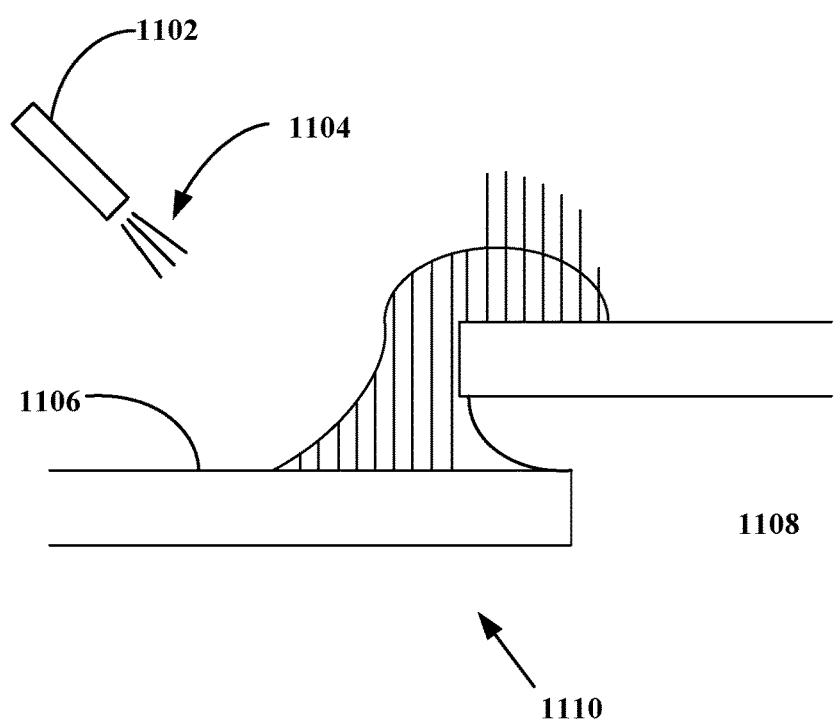
FIG. 11 is a diagram illustrating another example of using spray forming to manufacture a structural joint.

FIG. 11 is a diagram illustrating another example of using spray forming to manufacture a structural joint 1110. A structure 1100 may include a first portion 1106, a second portion 1108, and the structural joint 1110. In the example of FIG. 11, the first portion 1106 and the second portion 1108 may run parallel or nearly parallel to each other. The first portion 1106 and the second portion 1108 may be near each other. Accordingly, the first portion 1106 and the second portion 1108 may have a gap between them. The spray form material 1104 may be used to build up the area in the gap to connect the first portion 1106 and the second portion 1108 to from the structural joint 1110.

The structural joint 1110 may be formed between the first portion 1106 and the second portion 1108 using nozzle 1102 of a spray forming device as discussed with respect to the 3-D printing devices 100, 400 of FIGS. 1A-1B and 4. The nozzles 1102 may spray the spray form material 1104, e.g., metal (or metal alloy). The spray form material may be a metal that is compatible with each material of the first portion 1106 and the second portion 1108. For example, the first portion 1106, the second portion 1108, and the spray form material 1104 may be compatible metals. In one aspect, the first portion 1106 and the second portion 1108 may be made from the same metal (or metal allow) and the spray form material 1104 may be a metal (or metal alloy) compatible with the metal or metal allow of the first portion 1106 and the second portion 1108.

The structural joint 1110 may be formed based on instructions. The instructions may be based on a data model of the structural joint 1110. The data model may include materials such as a metal or metals, an alloy or alloys for the first portion 1106, the second portion 1108, the spray form material 1104, or a combination of the first portion 1106, the second portion 1108, or the spray form material 1104. The data model may include a temperature for the spray form material 1104. The data model may include sizes of the first portion 1106 and the second portion 1108, e.g., to that the first portion 1106 and the second portion 1108 may be positioned. The data model may include other attributes of the first portion 1106, the second portion 1108, the spray form material 1104, or a combination of the first portion 1106, the second portion 1108, or the spray form material 1104. Instructions may be developed based on the data model. Accordingly, the structural joint 1110 may be printed based on the instructions. The printing may include spray forming the material to produce the structural joint 1110. The structural joint 1110 may connect the first portion 1106 to the second portion 1108.

Figure 12:
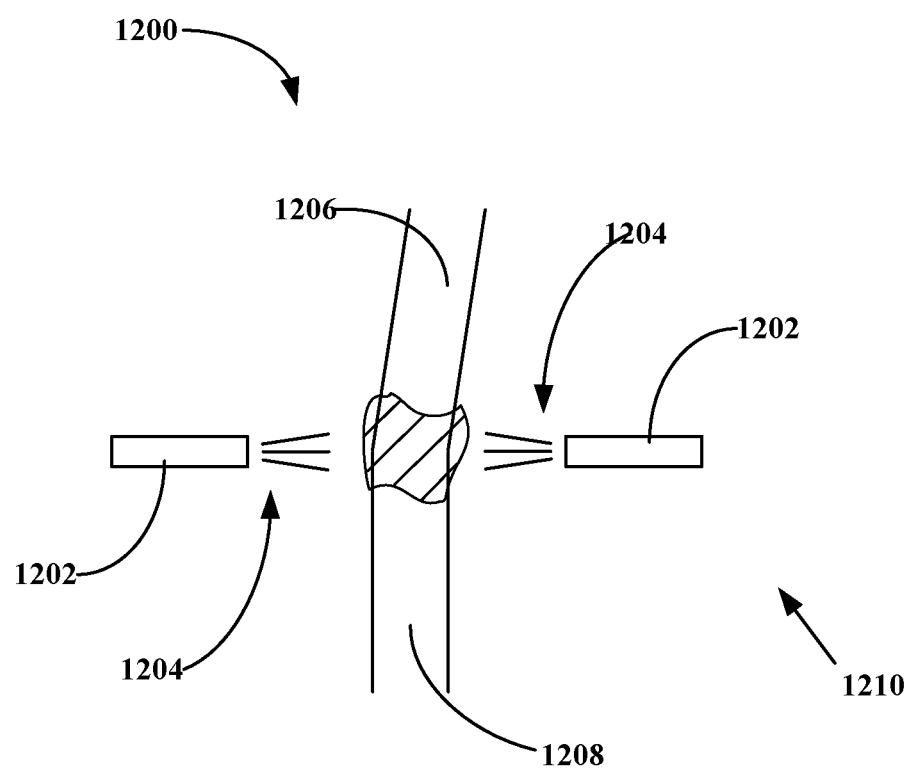
FIG. 12 is a diagram illustrating another example of using spray forming to manufacture a structural joint.

FIG. 12 is a diagram illustrating another example of using spray forming to manufacture a structural joint 1210. A structure 1200 may include a first portion 1206, a second portion 1208, and the structural joint 1210. The structural joint 1210 may be formed at tips of the first portion 1206 and the second portion 1208 at a location (of structural joint 1210) where the first portion 1206 and the second portion 1208 meet. In the example of FIG. 12, the tip of the first portion 1206 and the tip of the second portion 1208 may meet at an angle.

The structural joint 1210 may be formed between the first portion 1206 and the second portion 1208 using nozzle 1202 of a spray forming device as discussed with respect to the 3-D printing devices 100, 400 of FIGS. 1A-1B and 4. The nozzles 1202 may spray the spray form material 1204, e.g., metal (or metal alloy). The spray form material may be a metal that is compatible with each material of the first portion 1206 and the second portion 1208. For example, the first portion 1206, the second portion 1208, and the spray form material 1204 may be compatible metals. In one aspect, the first portion 1206 and the second portion 1208 may be made from the same metal (or metal allow) and the spray form material 1204 may be a metal (or metal alloy) compatible with the metal or metal allow of the first portion 1206 and the second portion 1208.

The structural joint 1210 may be formed based on instructions. The instructions may be based on a data model of the structural joint 1210. The data model may include materials such as a metal or metals, an alloy or alloys for the first portion 1206, the second portion 1208, the spray form material 1204, or a combination of the first portion 1206, the second portion 1208, or the spray form material 1204. The data model may include a temperature for the spray form material 1204. The data model may include sizes of the first portion 1206 and the second portion 1208, e.g., to that the first portion 1206 and the second portion 1208 may be positioned. The data model may include other attributes of the first portion 1206, the second portion 1208, the spray form material 1204, or a combination of the first portion 1206, the second portion 1208, or the spray form material 1204. Instructions may be developed based on the data model. Accordingly, the structural joint 1210 may be printed based on the instructions. The printing may include spray forming the material to produce the structural joint 1210. The structural joint 1210 may connect the first portion 1206 to the second portion 1208.

Figure 13:
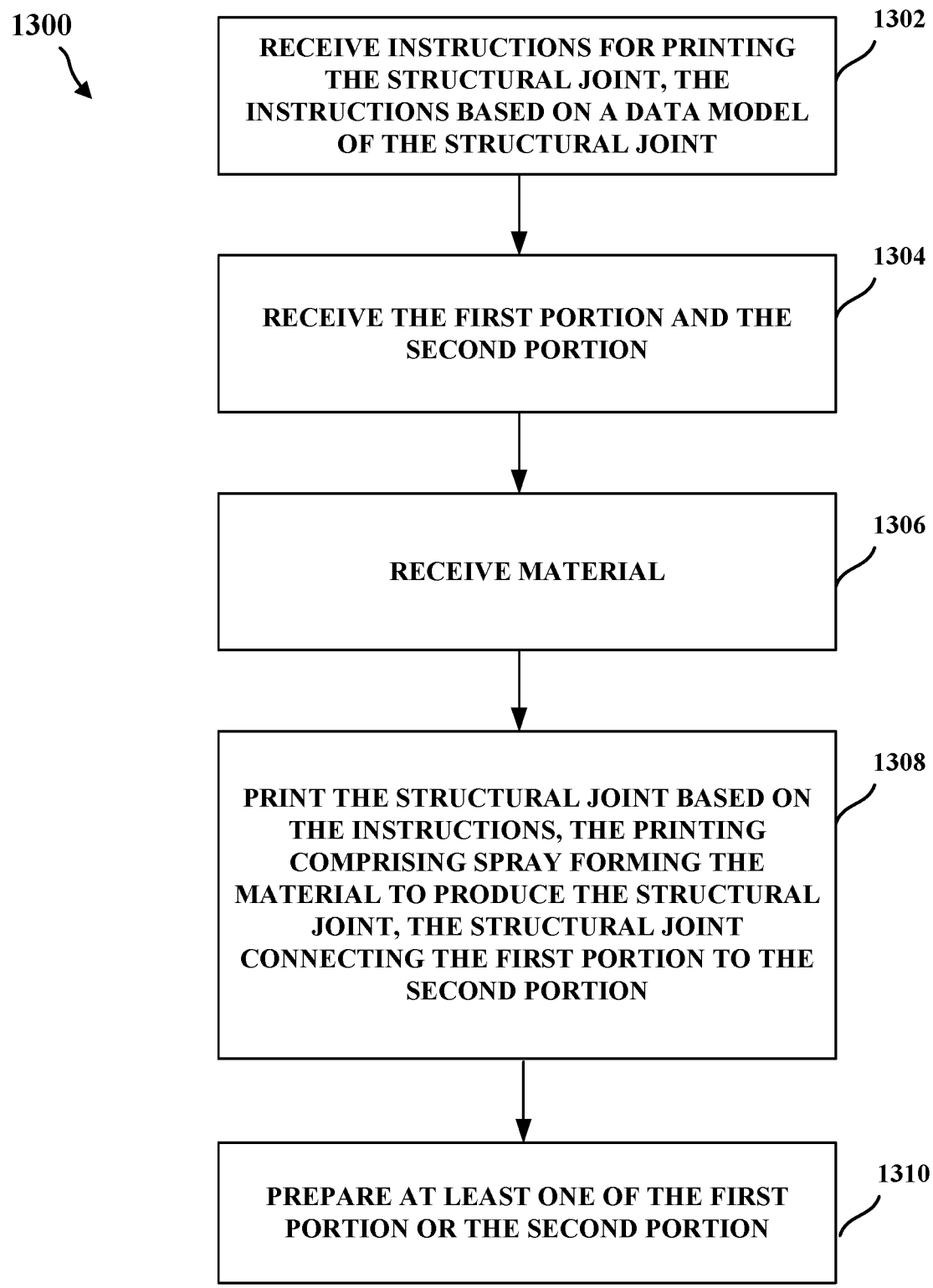
FIG. 13 is a flow diagram illustrating an exemplary method of using spray forming to manufacture a structural joint.

FIG. 13 is a flow diagram 1300 illustrating an exemplary method of using spray forming to manufacture a structural joint. The structure may include a first portion, a second portion, and a structural joint. At 1302, an apparatus implementing the method may receive instructions for printing the structural joint. The instructions may be based on a data model of the structural joint. For example, an apparatus implementing the method such as a 3-D printer 100 or 3-D printer 400 may receive instructions for printing the structural joint (814, 910, 1010, 1110, 1210). The instructions may be based on a data model of the structural joint (814, 910, 1010, 1110, 1210).

At 1304, an apparatus implementing the method may receive the first portion and the second portion. For example, an apparatus implementing the method such as a 3-D printer 100 or 3-D printer 400 may receive the first portion (806, 906, 1006, 1106, 1206) and the second portion (808, 908, 1008, 1108, 1208). The first portion and the second portion may be a metal or metal alloy. In an aspect, the first portion may have a first conical tip and the second portion may have a second conical tip. (See, e.g., FIG. 9.)

At 1306, an apparatus implementing the method may receive material. For example, an apparatus implementing the method such as a 3-D printer 100 or 3-D printer 400 may receive material. The material may be a metal or metal alloy. The material may be used to form the spray form material (804, 904, 1004, 1104, 1204).

At 1308, an apparatus implementing the method may print the structural joint based on the instructions. The printing may include spray forming the material to produce the structural joint. The structural joint may connect the first portion to the second portion. For example, an apparatus implementing the method such as a 3-D printer 100 or 3-D printer 400 may print the structural joint (814, 910, 1010, 1110, 1210) based on the instructions. The printing may include spray forming the material (804, 904, 1004, 1104, 1204) to produce the structural joint (814, 910, 1010, 1110, 1210). The structural joint (814, 910, 1010, 1110, 1210) may connect the first portion (806, 906, 1006, 1106, 1206) to the second portion (808, 908, 1008, 1108, 1208). In an aspect, the printing may include spray forming the material to produce the structural joint and rotating the first portion and the second portion during the spray forming. (See, e.g., FIG. 8.) In an aspect, printing may include joining a first conical tip to a second conical tip. (See, e.g., FIG. 9.)

At 1310, an apparatus implementing the method may prepare at least one of the first portion or the second portion. The preparing comprising a metallization of the at least one of the first portion or the second portion. For example, an apparatus implementing the method such as a 3-D printer 100 or 3-D printer 400 may prepare at least one of the first portion (806, 906, 1006, 1106, 1206) or the second portion (808, 908, 1008, 1108, 1208). The preparing may include a metallization of the at least one of the first portion or the second portion. A metallization may include an application of a thin layer of metal to regions of composite parts, e.g., the first portion (806, 906, 1006, 1106, 1206) and/or the second portion (808, 908, 1008, 1108, 1208), intended to adhere or bond to a cold spray deposit.

In an aspect, the first portion comprises a commercial off-the-shelf part.

In an aspect, the second portion comprises a commercial off-the-shelf part.

In an aspect, the first portion comprises a 3-D printed part.

In an aspect, the second portion comprises a 3-D printed part.

In an aspect, the second portion comprises a 3-D cold-spray printed part.

In an aspect, the first portion comprises a 3-D cold-spray printed part.

In an aspect, the second portion comprises a 3-D cold-spray printed part.

In an aspect, at least the first portion is held by a bracket during the printing of the structural joint.

In an aspect, at least the first portion is held by a robotic arm during the printing of the structural joint.

In an aspect, the first portion and the second portion are touching during the printing of the structural joint.

In an aspect, at least the first portion has been prepared to allow adherence of a cold spray metal deposit.

An aspect may use a vertical assembly cell to manufacture the structural joint as a part of an assembly process.

In an aspect, at least the first portion has been built up using cold spray metal deposit.

In an aspect, the first portion comprises a first material, the second portion comprises a second material, and the structural joint comprises a third material, and wherein the first material and the third material, and the second material and the third material have metalized properly to allow strong adherence.

In an aspect, the first material and the second material comprise the same material.

In an aspect, a third material may be configured to withstand stresses on a connection of a first material to the third material.

In an aspect, a third material may be configured to withstand stresses on a connection of a second material to the third material.

Figure 14:
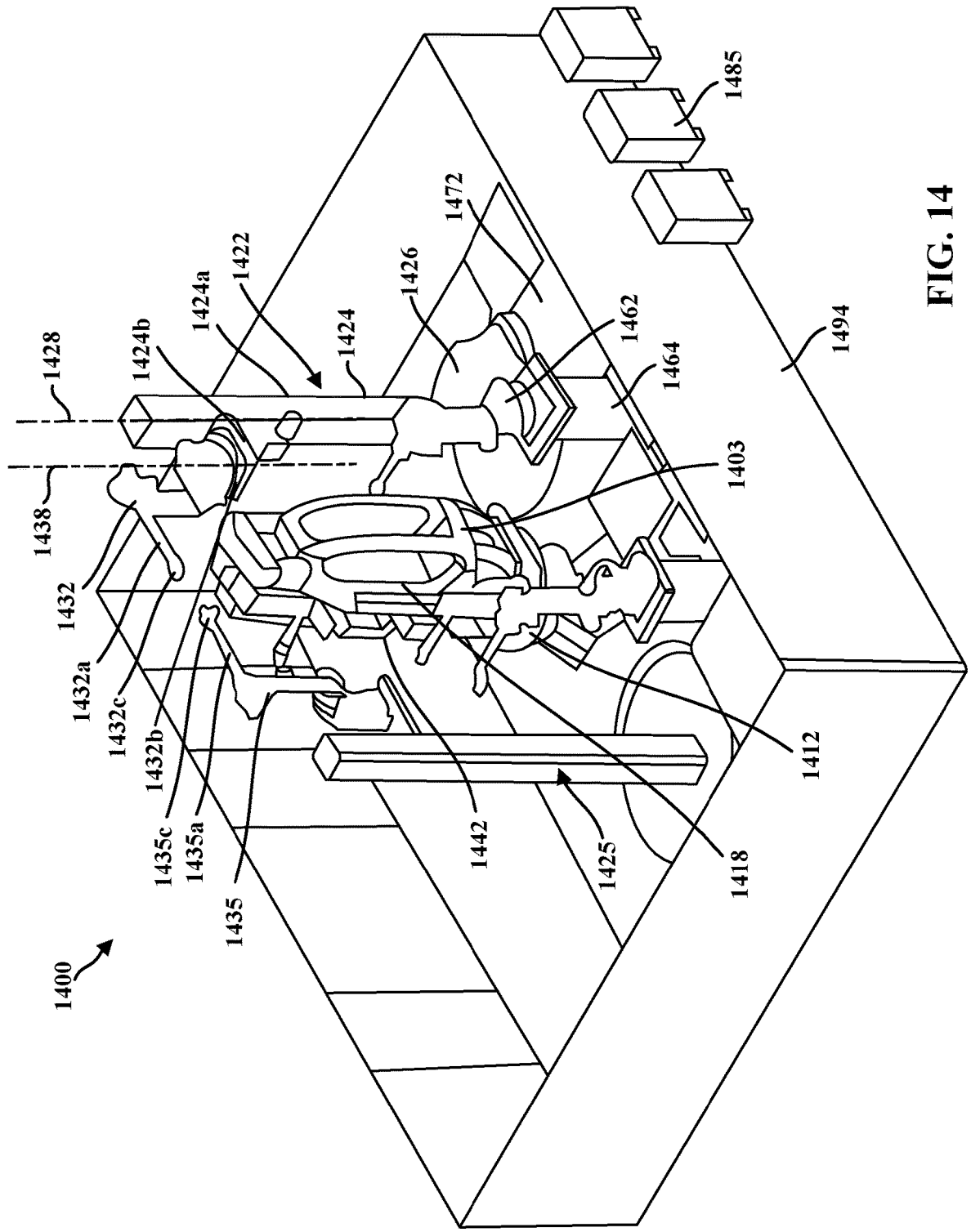
FIG. 14 illustrates an example of a manufacturing cell of a system for manufacturing a vehicle.

FIG. 14 illustrates an example of a manufacturing cell 1400 of a system for manufacturing a vehicle. The manufacturing cell may be vertical assembly cell. As described below, the vertical assembly cell may increase degrees of freedom and allows access for the cold spray gun to deposit metal at each site of contact between two pieces. The manufacturing cell 1400 is configured for assembling a frame 1403 of a vehicle. The manufacturing cell 1400 includes a positioner 1412, a robot carrier 1422 and a robot 1432. The positioner 1412 is configured to receive a fixture table 1442, where the fixture table 1442 is configured to hold the frame 1403. The term "frame" may also be referred as "space frame", "smart frame", "chassis", "supporting structure", or "supporting components" of a vehicle.

As shown in FIG. 14, the robot carrier 1422 includes a vertical lift 1424, where the vertical lift includes a vertical column 1424*a* and a shelf 1424*b*, where the shelf 1424*b* is movably attached to the vertical column 1424*a*, and extends radially outwards from the vertical column 1424*a*. The shelf 1424*b* is movable along a vertical direction. The robot 1432 is mounted on the shelf 1424*b* and is configured to assemble the frame 1403. The positioner 1412 is configured to support the frame 1403 in a vertical position, or a primarily vertical position, during an assembling process of the frame 1403.

The robot carrier 1422 may further includes a rotary base 1426. For example, the vertical lift 1424 is attached to the rotary base 1426. The base 1426 has a base central axis 1428, where the base 1426 is configured to be rotatable around the base central axis 1428. The robot carrier 1422 is configured to support the robot 1432. In this embodiment, the robot carrier 1422 has 2 degrees of freedom, vertical movement and rotation. The robot carrier 1422 has an independent rotation of the vertical lift column 1424*a*. Since the base 1426 is configured to be rotatable around the base central axis 1428, the vertical column 1424*a* mounted on the base 1426 is rotatable around the base central axis 1428 as well.

The robot 1432 may have various axis configurations. For example, the robot 1432 may have a robot base 1431*b* and an arm 1432*a*. The robot base 1431*b* is mounted on the shelf 1424*b* of the vertical lift 1424. The robot 1432 may have six axes, also called six degrees of freedom. The six axis robot 1432 allows for greater maneuverability, and can perform a wider variety of manipulations than robots with fewer axes. In other configurations, however, fewer than six axes may be used. In some embodiments, the robot 1432 has a first axis 1438 located at the robot base 1432*b*, allows the robot to rotate from side to side. The first axis 1438 is the central axis 1438 of the robot 1432. The robot 1432 is configured to rotate around the robot central axis 1438. This axis 1438 allows the robot 1432 to spin up to or past a full 1480 degree range from center, in either direction.

The robot 1432 may have a second axis which allows the lower arm 1432*a* of the robot 1432 to extend forward and backward. It is the axis powering the movement of the entire lower arm 1432*a*. The robot 1432 may have a third axis which extends the robot's reach. It allows the upper arm to be raised and lowered. On some articulated models, it allows the upper arm to reach behind the body, further expanding the work envelope. This axis gives the upper arm the better part access. The robot 1432 may have a fourth axis which aids in the positioning of the end effector and manipulation of the part to be assembled. The robot 1432 may further have a fifth axis which allows the wrist of the robot arm to tilt up and down. The robot 1432 may further have a sixth axis which is the wrist of the robot arm 1432*a*.

In some embodiments, the robot central axis 1438 is offset from the base central axis 1428, as shown in FIG. 14. The robot base 1431*b* is mounted on the shelf 1424*b* of the vertical lift 1424. Since the shelf 1424*b* is extending radially outwards from the base central axis 1428, the robot central axis 1438 has a distance from the base central axis 1428. When the vertical lift 1424 is rotatable around the base central axis 1438, the shelf 1424*b* is also rotatable around the base central axis 1438. Thus, the robot 1432 is further rotatable about an arc movement around the base central axis 1428, in addition to being rotatable around the first axis 1438 of the robot 1432. This sweeping motion of robot base 1432*a* about the base central axis 1428 extends the work area of the robot 1432 to include the area on either side, and behind the vertical axis 1428. In this way, the robot 1432 is capable of independently moving vertically up and down, rotating from side-to-side, and in a combination of the aforementioned movements. Therefore, the robot 1432 is not limited to its own degrees of freedom. The robot 1432 has a larger work envelope. The robot carrier 1422 and the robot 1432 together have eight degrees of freedom. The more degrees of freedom enables the manufacturer to use fewer robots, which can reduce cost and increase efficiency.

In some embodiments, the robot carrier 1422 may include a control unit (not shown). The control unit is configured to control the robot carrier 1422. The manufacturing cell 1400 may further include a controller 1485, which can be configured to control the robot carrier 1422, the robot 1432, the positioner 1412, and controls for the rest of the system. The controller 1485 can be configured to control an assembling process of the frame 1403, for example, an automatic assembling process. The entire assembling process can be automated with high efficiency and low cost. In other embodiments, a central control station may communicate to the robot carrier 1422 to issue instructions for the assembling process. In still other embodiments, the robot carrier 1422 may be authorized to perform certain functions and make certain decisions on its own, while a central station or an on-site server may have control over other, potentially more important decisions which may be conveyed to the robot carrier 1422 electronically or otherwise. In short, a wide variety of control automation configurations may be implemented into the system depending on the application and objectives, and each such configuration is intended to fall within the spirit and scope of the present disclosure.

As shown in FIG. 14, the positioner 1412 is configured to support the fixture table 1442 in a vertical position during an assembling process of the frame 1403. Some advantages of the vertical manufacturing cell 1400 include better accessibility, increased degrees of freedom, reduced footprint, fewer part transfer, reduced component count, and lower maintenance than conventional assembly or manufacturing technologies. The vertical assembly cell may also allow access for the cold spray gun to deposit metal at each site of contact between two pieces. Accordingly, in an aspect, the vertical assembly cell may allow for performing cold-spray operations during assembly by allowing access for the cold spray gun to deposit metal as pieces are assembled. The vertical space utilization can be maximized. The robots can access the frame from more angles, which can increase the efficiency of an assembling process of the frame 1403.

In some embodiments, the manufacturing cell 1400 may further include a second robot carrier 1425 and a second robot 1435. Both robots 1432, 1435 work together to assemble the frame 1403, or parts thereof. For example, the second robot carrier 1425 may be positioned at an opposite side of the positioner 1412 than the robot carrier 1422. For another example, the robot carrier 1422 may be positioned at +45 degrees relative to the positioner 1412, and the second robot carrier 1425 may be positioned at −45 degrees relative to the positioner 1412. The manufacturing cell 1400 may further include one or more robot carriers. There is no limit to the number of robot carriers. There are also many configurations to place the one or more robot carriers. The examples discussed above are only for illustration purpose, and there is no limitation to the relative positions of the one or more robot carriers.

In some embodiments, the manufacturing cell 1400 may further include one or more stationary robots 1462. For example, each of the one or more stationary robots 1462 may be placed on a corresponding pedestal 1464, which elevates the stationary robot to a desired working height to enable greater accessibility and reach. The stationary robots 1462 may perform a variety of tasks, such as assembling assemblies, subassemblies, assisting, etc.

As shown in FIG. 14, the manufacturing cell 1400 may offer twenty-five or more degrees of freedom, redundant or otherwise. The robot 1432 may offer six degrees of freedom. The robot carrier 1422 may offer two degrees of freedom. The positioner 1412 may offer three degrees of freedom. The manufacturing cell 1400 with one robot and one robot carrier may have eleven degrees of freedom. The second robot carrier 1425 and the second robot 1435 may offer an additional 8 degrees of freedom. The manufacturing cell 1400 with two robots and two robot carriers may offer a total of nineteen degrees of freedom. When manufacturing cell 1400 includes a stationary robot 1462 with additional six degrees of freedom, there may be a total of twenty-five degrees of freedom. The manufacturing cell 1400 can have a lower number of robots than would otherwise be necessary because of the large number of degrees of freedom. The manufacturing cell 1400 offers agility and dexterity for assembling a frame of a wide variety of vehicles.

The manufacturing cell 1400 allows for a plurality of robots to be positioned strategically inside the cell, enabling pooled work envelopes. The compact footprint of the manufacturing cell 1400 further has the advantage of saving space. The manufacturing cell 1400 may have various dimensions. For example, the manufacturing cell 1400 may have an area between 400 square feet and 3600 square feet. The space of the manufacturing cell 1400 can be significantly lower than the conventional assembly line for vehicles.

Moreover, the vertical manufacturing cell 1400 enables robots to act as fixtures, in place of a customary stationary fixture, to thereby achieve an overall reduction or elimination of fixtures during the assembling process.

For example, the fixture table may have legs with wheels that enable movement on the floor, while holding the frame within the required tolerance.

Referring back to FIG. 14, the manufacturing cell 1400 can be configured to assemble, bond, fasten, and measure the frame 1403. For example, the manufacturing cell 1400 can be configured to assemble, apply adhesive, bolt, and measure the frame 1403. The robot 1432, 1435 can be configured to perform multiple tasks, including, but not being limited to, assembling, bonding, fastening, and measuring the frame. For example, the arms 1432*a*, 1435*a* of the robots 1432, 1435 may be configured to be coupled to a plurality of end effectors. Each of the plurality of end effectors can be configured to perform different functions. The plurality of end effectors can be configured to be quickly exchanged. The manufacturing cell 1400 further includes tool tables 1472. The tool tables can be configured to hold the plurality of end effectors, or subassemblies, or parts, of the frame 1403.

In some embodiments, the manufacturing cell 1400 may include an adhesive injection subsystem. The robots 1432, 1435 are further configured to apply an adhesive to bond the frame 1403. The adhesive injection subsystem may include adhesive injection end effectors 1432*c*, 1435*c*. The frame 1403 includes a plurality of connecting components 14014, 1401*b*, 1401*c*, a plurality of joint members 1402, or nodes 1402. Each joint member may be sized and shaped to mate with at least a subset of the plurality of the connecting components 14014, 1401*b*, 1401*c* to form a three-dimensional frame structure 1403. The plurality of joint members 1402, or nodes 1402, may have built-in adhesive ports. For example, the robots 1432, 1435 of FIG. 14 may be configured to grab adhesive injection end effectors 1432*c*, 1435*c*. The arms 1432*a*, 1435*a* of the robots 1432, 1435 may be configured to be coupled to the adhesive injection end effectors 1432*c*, 1435*c*.

In some embodiments, the manufacturing cell 1400 may include one or more fastener drivers (not shown). The robots 1432, 1435 are further configured to install fasteners to the frame 1403 by using the fastener drivers. For example, the arms 1432*a*, 1435*a* of the robots 1432, 1435 may be configured to be coupled to end effectors for fastener drivers. The one or more fastener drivers may be attached to the arms 1432*a*, 1435*a* of the robots 1432, 1435, to reach all necessary locations, by leveraging all axes of freedom that the manufacturing cell 1400 offers. The number of robots and fastener drivers needed may be minimized because of the better reach and accessibility offered by the increased number of degrees of freedom of the manufacturing cell 1400.

In some embodiments, the manufacturing cell 1400 may include one or more metrology devices (not shown). Metrology devices may include, for example, a laser scanner. The robots 1432, 1435 are further configured to measure multiple points on the frame 1403 to perform a general measurement of the frame 1403. For example, the arms 1432*a*, 1435*a* of the robots 1432, 1435 may be configured to be coupled to end effectors for metrology devices. The one or more metrology devices may be attached to the arms 1432*a*, 1435*a* of the robots 1432, 1435. For example, the robots 1432, 1435 may be configured to scan and measure the frame 1403. As an example, the robots 1432, 1435 may be configured to measure the frame 1403 by scanning the frame 1403. As another example, the robots 1432, 1435 may be configured to measure the frame 1403 by probing the frame 1403. The vertical manufacturing cell 1400 may advantageously ensure full access of the frame 1403, avoiding need for additional components or hardware (e.g., overhead gantry rail system).

In some embodiments, the manufacturing cell 1400 may include one or more subassembly robots and one or more subassembly tables. For example, each of the one or more subassembly robots may be configured to assemble a subassembly or subsection of the frame 1403 on a corresponding subassembly table. The subassembly robots may pass the assembled subassemblies to the robots 1432, 1435 on the robot carriers 1422, 1425. The robots 1432, 1435 may assemble the frame 1403 from the subassemblies. The one or more subassembly robots may enable concurrent assembling and therefore may further reduce the overall time of the assembling process.

For example, the manufacturing cell 1400 may include one or more tool changers. The tool changers are configured to exchange the plurality of end effectors for the robots. For example, tool changers may be used to switch from specially designed end effectors for assembly, scanning heads for measurements, fastener drivers for bolt installations, and adhesive injection end effectors for adhesive and sealer applications.

As shown in FIG. 14, the manufacturing cell 1400 may be surrounded by safety barrier 1494 with safety sensors, and interlocks. For example, the safety barrier 1494 enable the fixture table 1442 holding the frame 1403 to enter the manufacturing cell 1400 and exit the manufacturing cell 1400, and further provide a safety measure to the manufacturing cell 1400. For example, when the safety sensors detect an unexpected violation, the safety sensors may send signals to the controller 1485 to safely halt the assembling process. Accordingly, if an individual inadvertently enters the manufacturing cell 1400, the controller 1485 may safely halt the assembling process which in turn may render stationary the currently moving parts that may otherwise be dangerous and may cause significant harm to the individual. In sum, harm may be avoided using the safety barrier 1494.

In some embodiments, the safety barrier 1494 includes photoelectric light presence sensors.

The manufacturing cell 1400 offers agility and dexterity with reduced duplication of bonding, fastening, and measurement equipment. Scalability of the manufacturing cell 1400 can be accomplished through the addition of derivative manufacturing cells to the vertical manufacturing cell 1400, or decoupling of fastening, bonding, and or measurement operations. Scalability can also be achieved through duplication of the manufacturing cells in series or parallel, or a combination of the two. Flexibility can be attained through the robots' use of a virtually unlimited number of customized end effectors and other tools for performing a wide variety of specialized operations on the vehicle.

The previous description is provided to enable any person skilled in the art to practice the various aspects described herein. Various modifications to these exemplary embodiments presented throughout this disclosure will be readily apparent to those skilled in the art, and the concepts disclosed herein may be applied to 3-D printing techniques using spray forming. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(*f*), or analogous law in applicable jurisdictions, unless the element is expressly recited using the phrase "means for" or, in the case of a method claim, the element is recited using the phrase "step for."

What is claimed is:

1. A method of forming a structure, the structure including a first portion, a second portion, and a structural joint, the method comprising:
   receiving instructions for printing the structural joint, the instructions based on a data model of the structural joint;
   receiving the first portion and the second portion, the first portion having a first conical tip and the second portion having a second conical tip;
   receiving material; and
   printing the structural joint based on the instructions, the printing comprising spray forming the material to produce the structural joint, the structural joint connecting the first portion to the second portion, including joining the first conical tip to the second conical tip.

2. The method of claim 1, wherein the structural joint fills an area of the first conical tip and the second conical tip.

3. The method of claim 1, wherein at least one of the first portion or the second portion comprise a commercial off-the-shelf part.

4. The method of claim 1, wherein the first portion comprises a 3-D printed part.

5. The method of claim 4, wherein the second portion comprises a second 3-D printed part.

6. The method of claim 4, wherein the second portion comprises a 3-D cold-spray printed part.

7. The method of claim 1, wherein the first portion comprises a 3-D cold-spray printed part.

8. The method of claim 7, wherein the second portion comprises a second 3-D cold-spray printed part.

9. The method of claim 1, wherein at least the first portion is held by a bracket during the printing of the structural joint.

10. The method of claim 1, wherein at least the first portion is held by a robotic arm during the printing of the structural joint.

11. The method of claim 1, wherein the first portion and the second portion are physical contact during the printing of the structural joint.

12. The method of claim 1, further comprising using a vertical assembly cell.

13. The method of claim 1, wherein at least the first portion has been built up using cold spray metal deposit.

14. The method of claim 1, wherein the first portion comprises a first material, the second portion comprises a second material, and the structural joint comprises a third material.

15. The method of claim 14, wherein the third material is configured to withstand stresses on the connection of the first material to the third material.

16. The method of claim 14, wherein the third material is configured to withstand stresses on the connection of the second material to the third material.

17. The method of claim 14, further comprising preparing at least one of the first portion or the second portion, the preparing comprising a metallization of the at least one of the first portion or the second portion.

18. The method of claim 14, wherein the first material and the second material comprise the same material.

19. An apparatus for forming a structure, the structure including a first portion, a second portion, and a structural joint, the apparatus, comprising:
   a first receiver configured to receive the first portion, the first portion having a first conical tip;
   a second receiver configured to receive the second portion, the second portion having a second conical tip;
   a material receiver configured to receive material;
   a memory; and
   at least one processor coupled to the memory and configured to:
      receive instructions for printing the structural joint, the instructions based on a data model of the structural joint; and
      control printing of the structural joint based on the instructions, the printing comprising spray forming the material to produce the structural joint, the structural joint connecting the first portion to the second portion, including joining the first conical tip to the second conical tip.

20. The apparatus of claim 19, wherein the structural joint fills an area of the first conical tip and the second conical tip.

21. The apparatus of claim 19, wherein at least one of the first portion or the second portion comprise a commercial off-the-shelf part.

22. The apparatus of claim 19, wherein the first portion comprises a 3-D printed part.

23. The apparatus of claim 22, wherein the second portion comprises a second 3-D printed part.

24. The apparatus of claim 22, wherein the second portion comprises a 3-D cold-spray printed part.

25. The apparatus of claim 19, wherein the first portion comprises a 3-D cold-spray printed part.

26. The apparatus of claim 25, wherein the second portion comprises a second 3-D cold-spray printed part.

27. The apparatus of claim 19, wherein at least the first portion is held by a bracket during the printing of the structural joint.

28. The apparatus of claim 19, wherein at least the first portion is held by a robotic arm during the printing of the structural joint.

29. The apparatus of claim 19, wherein the first portion and the second portion are touching during the printing of the structural joint.

30. The apparatus of claim 19, further comprising using a vertical assembly cell.

31. The apparatus of claim 19, wherein at least the first portion has been built up using cold spray metal deposit.

32. The apparatus of claim 19, wherein the first portion comprises a first material, the second portion comprises a second material, and the structural joint comprises a third material.

33. The apparatus of claim 32, wherein the first material and the second material comprise the same material.

34. The apparatus of claim 32, wherein the third material is configured to withstand stresses on the connection of the first material to the third material.

35. The apparatus of claim 32, wherein the third material is configured to withstand stresses on the connection of the second material to the third material.

36. The apparatus of claim 32, the at least one processor further configured to control the apparatus to cause the apparatus to prepare at least one of the first portion or the second portion, the preparing comprising a metallization of the at least one of the first portion or the second portion.

37. An apparatus for forming a structure, the structure including a first portion, a second portion, and a structural joint, the apparatus comprising:

means for receiving instructions for printing the structural joint, the instructions based on a data model of the structural joint;

means for receiving the first portion and the second portion, the first portion having a first conical tip and the second portion having a second conical tip;

means for receiving material; and means for printing the structural joint based on the instructions, the printing comprising spray forming the material to produce the structural joint, the structural joint connecting the first portion to the second portion, including joining the first conical tip to the second conical tip.

38. A non-transitory computer-readable medium storing computer executable code, comprising code to:

receive instructions for printing a structural joint, the instructions based on a data model of the structural joint;

receive a first portion and a second portion, the first portion having a first conical tip and the second portion having a second conical tip;

receive material; and print the structural joint based on the instructions, the printing comprising spray forming the material to produce the structural joint, the structural joint connecting the first portion to the second portion, including joining the first conical tip to the second conical tip.

\* \* \* \* \*